(12) United States Patent  
Scalisi et al.

(10) Patent No.: US 9,197,867 B1  
(45) Date of Patent: Nov. 24, 2015

(54) IDENTITY VERIFICATION USING A SOCIAL NETWORK

(71) Applicant: SkyBell Technologies, Inc., Irvine, CA (US)

(72) Inventors: Joseph Frank Scalisi, Yorba Linda, CA (US); Desiree Mejia, Yorba Linda, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 14/740,199

(22) Filed: Jun. 15, 2015

Related U.S. Application Data

(63) Continuation-in-part of application No. 14/612,376, filed on Feb. 3, 2015, now Pat. No. 9,058,738, and a continuation-in-part of application No. 14/724,723, filed on May 28, 2015, and a continuation-in-part of application No. 14/724,702, filed on May 28, 2015.

(60) Provisional application No. 62/135,133, filed on Mar. 18, 2015, provisional application No. 62/016,057, filed on Jun. 23, 2014, provisional application No. 62/016,053, filed on Jun. 23, 2014, provisional application No. 62/016,050, filed on Jun. 23, 2014.

(51) Int. Cl.  
*H04N 9/47* (2006.01)  
*H04N 7/18* (2006.01)

(52) U.S. Cl.  
CPC ................ *H04N 7/186* (2013.01); *H04N 7/188* (2013.01)

(58) Field of Classification Search  
CPC ............ G06Q 50/265; G06K 9/00221; G06K 9/00288; H04N 7/186; H04N 7/188; H04N 5/232319  
USPC ......................................................... 348/143  
See application file for complete search history.

(56) References Cited

U.S. PATENT DOCUMENTS

| 3,708,742 A | 1/1973 | Gunn |
| 4,523,193 A | 6/1985 | Levinson |
| D283,130 S | 3/1986 | Boenning |
| D297,222 S | 8/1988 | Rauch |
| 4,843,461 A | 6/1989 | Tatsumi |
| 5,210,520 A | 5/1993 | Housley |
| 5,428,388 A | 6/1995 | von Bauer |
| 5,493,618 A | 2/1996 | Stevens |

(Continued)

FOREIGN PATENT DOCUMENTS

| CN | 1902609 | 5/2010 |
| CN | 202872976 | 4/2013 |

(Continued)

OTHER PUBLICATIONS iDoorCam—A Wi-Fi Enabled, Webcam Doorbell—Downloaded on Sep. 3, 2013 from http://www.idoorcam.com/.

(Continued)

*Primary Examiner* — Andy Rao  
*Assistant Examiner* — Jared Walker

(57) ABSTRACT

A doorbell system can be used to identify a visitor. Embodiments can include detecting the visitor, taking a picture of the visitor, searching an online social network that has a plurality of pictures, and determining the identity of the visitor. The doorbell system can use the identity to know how to respond to the visitor.

26 Claims, 12 Drawing Sheets

(56) References Cited

U.S. PATENT DOCUMENTS

| | | |
|---|---|---|
| 5,521,578 A | 5/1996 | DelValle |
| D371,086 S | 6/1996 | Collins |
| D381,638 S | 7/1997 | Kruse |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,429,893 B1 | 8/2002 | Xin |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| D500,751 S | 1/2005 | Yukikado |
| D501,652 S | 2/2005 | Pierson |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,193,644 B2 | 3/2007 | Carter |
| D562,306 S | 2/2008 | Jeong |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,477,134 B2 | 1/2009 | Langer |
| 7,492,303 B1 | 2/2009 | Levitan |
| D588,574 S | 3/2009 | Takahata |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,752,070 B2 | 7/2010 | Hatcher |
| 7,956,576 B2 | 6/2011 | Neu |
| 8,016,676 B2 | 9/2011 | Carter |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,669,876 B2 | 3/2014 | Anderson |
| D707,147 S | 6/2014 | Crippa |
| 8,780,201 B1 | 7/2014 | Scalisi et al. |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 2003/0025599 A1 | 2/2003 | Monroe |
| 2004/0085205 A1 | 5/2004 | Yeh |
| 2004/0085449 A1 | 5/2004 | Millet |
| 2004/0086093 A1 | 5/2004 | Schranz |
| 2004/0178889 A1 | 9/2004 | Buckingham |
| 2004/0229569 A1 | 11/2004 | Franz |
| 2004/0257336 A1 | 12/2004 | Hershkovitz |
| 2005/0007451 A1 | 1/2005 | Chiang |
| 2005/0071879 A1 | 3/2005 | Haldavnekar |
| 2005/0097248 A1 | 5/2005 | Kelley |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0271678 A1 | 11/2006 | Jessup |
| 2007/0046442 A1 | 3/2007 | Bartorelli |
| 2007/0126574 A1 | 6/2007 | Langer |
| 2007/0146115 A1 | 6/2007 | Roosli |
| 2007/0194945 A1 | 8/2007 | Atkinson |
| 2008/0036862 A1 | 2/2008 | Lang |
| 2008/0128586 A1 | 6/2008 | Johnson |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0284578 A1 | 11/2009 | Carter |
| 2009/0296641 A1 | 12/2009 | Bienas |
| 2010/0087161 A1 | 4/2010 | Young |
| 2010/0103300 A1 | 4/2010 | Jones |
| 2010/0134072 A1 | 6/2010 | Neu |
| 2010/0195810 A1 | 8/2010 | Mota |
| 2010/0245060 A1 | 9/2010 | Tylicki |
| 2010/0276570 A1 | 11/2010 | Moser |
| 2011/0121940 A1 | 5/2011 | Jones |
| 2011/0207509 A1 | 8/2011 | Crawford |
| 2011/0287718 A1 | 11/2011 | Abel |
| 2012/0027248 A1 | 2/2012 | Feris |
| 2012/0044049 A1 | 2/2012 | Vig |
| 2012/0044050 A1 | 2/2012 | Vig |
| 2012/0098439 A1 | 4/2012 | Recker |
| 2012/0108215 A1 | 5/2012 | Kameli |
| 2012/0113253 A1 | 5/2012 | Slater |
| 2012/0162416 A1 | 6/2012 | Su |
| 2012/0229282 A1 | 9/2012 | Zagami |
| 2012/0230203 A1 | 9/2012 | Casey |
| 2012/0262581 A1 | 10/2012 | Carter |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0327225 A1 | 12/2012 | Barley |
| 2012/0327246 A1 | 12/2012 | Senior |
| 2013/0020875 A1 | 1/2013 | Wozniak |
| 2013/0045763 A1 | 2/2013 | Ruiz |
| 2013/0057695 A1 | 3/2013 | Huisking |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0293722 A1 | 11/2013 | Chen |

(56) References Cited

U.S. PATENT DOCUMENTS

| | | |
|---|---|---|
| 2014/0015967 A1 | 1/2014 | Moore |
| 2014/0088761 A1 | 3/2014 | Shamlian |
| 2014/0125754 A1 | 5/2014 | Haywood |
| 2014/0149706 A1 | 5/2014 | Shim |
| 2014/0167676 A1 | 6/2014 | Mack |
| 2014/0253725 A1 | 9/2014 | Hsu |
| 2015/0022618 A1 | 1/2015 | Siminoff |
| 2015/0022620 A1 | 1/2015 | Siminoff |
| 2015/0029335 A1 | 1/2015 | Kasmir et al. |
| 2015/0049191 A1 | 2/2015 | Scalisi et al. |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0092055 A1 | 4/2015 | Scalisi et al. |
| 2015/0112885 A1 | 4/2015 | Fadell |
| 2015/0194839 A1 | 7/2015 | Wojcik |

FOREIGN PATENT DOCUMENTS

| | | |
|---|---|---|
| CN | 202939738 | 5/2013 |
| EP | 684743 | 7/1999 |
| GB | 2400958 | 12/2005 |
| WO | 01/93220 | 12/2001 |
| WO | WO2007111802 | 10/2007 |

OTHER PUBLICATIONS

Squaritz IDS—Intelligent Doorbell System—Downloaded on Aug. 15, 2013 from http://www.indiegogo.com/projects/squaritz-ids-intelligent-doorbell-system.
Wireless Video Doorbell Pager—Downloaded on Aug. 9, 2013 from http://www.indiegogo.com/projects/wireless-video-doorbell-pager--4.
Lockitron—Downloaded on Jul. 24, 2013 from https://lockitron.com/preorder.
Eyetalk for Home—Downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
DefenDoor by Glate LLC—Downloaded on Dec. 11, 2014 from https://www.kickstarter.com/projects/85455040/defendoor-a-home-security-system-that-syncs-with-y.
Notifi by Chamberlain—Downloaded on Jan. 9, 2015 from http://www.cnet.com/products/chamberlain-notifi-video-door-chime/.
i-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
DoorBird—Downloaded on Jan. 23, 2015 from http://www.doorbird.com/.
Chui Doorbell—Downloaded on Jan. 23, 2015 from http://www.getchui.com/.
Chui Doorbell—Downloaded on Jan. 23, 2015 from http://techcrunch.com/2014/04/18/214-technologies-is-crowdfunding-a-smart-doorbell-called-chui/.
GoPano—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
Alarm.com Garage Door Camera—Downloaded on Mar. 9, 2015 from http://www.cnet.com/au/products/alarm-com-for-apple-watch/.
Rollup iHome peephole doorbell—Downloaded on May 7, 2015 from http://www.rollupcn.com.
Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
MyInterCom video system—Downloaded on Jun. 8, 2015 from http://myintercom.de/en/funktionsweise.
Doorbot—Downloaded on Nov. 18, 2013 from http://www.craigncompany.com/home-tech-doorbot/; prior art publication at least as of Jun. 10, 2013.
Doorbot—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
Doorbot—Downloaded on Nov. 18, 2013 from http://www.digitaltrends.com/lifestyle/doorbot-camera-see-visitors-smartphone/; prior art publication at least as of Dec. 9, 2012.
Doorbot website—Downloaded on Nov. 18, 2013 from http://www.getdoorbot.com/.
Doorbot users manual—Downloaded on Nov. 18, 2013 from http://static.mydoorbot.com/DoorBot%20Users%20Manual%201.0.pdf.
Doorbot "fact sheet"—Downloaded on Nov. 18, 2013 from http://cdn.shopify.com/s/files/1/024716501/files/DoorBotMediaKit.pdf?17037.
Doorbot "features kit"—Downloaded on Nov. 18, 2013 from http://cdn.shopify.com/s/files/1/0247/6501/files/DoorBot_Features_Kit.pdf?17037.
CellNock index page—Originally downloaded on Sep. 23, 2013 from http://cellnock.com/index.html; The website says CellNock is "patent pending".
CellNock about founder page—downloaded on Nov. 18, 2013 from http://cellnock.com/index.html; The website says CellNock is "patent pending".
CellNock learn more page—Downloaded on Nov. 18, 2013 from http://cellnock.com/learn_more.htm; The website says CellNock is "patent pending".
CellNock product page—Downloaded on Nov. 18, 2013 from http://cellnock.com/products.htm; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
MySkyBell.com—Part 1 (previously iDoorCam.com)—Downloaded on Nov. 18, 2013 from http://www.myskybell.com/.
MySkyBell.com—Part 2 (previously iDoorCam.com)—Downloaded on Nov. 18, 2013 from http://www.myskybell.com/.
MySkyBell.com—Part 3 (previously iDoorCam.com)—Downloaded on Nov. 18, 2013 from http://www.myskybell.com/.
MySkyBell.com—Part 4 (previously iDoorCam.com)—Downloaded on Nov. 18, 2013 from http://www.myskybell.com/.
MySkyBell.com—Part 5 (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
EyeTalk for home—Downloaded on May 24, 2013 from http://www.revolutionaryconceptsinc.com/forhome.html.
EyeTalk Product—Downloaded on Nov. 18, 2013 from http://www.revolutionaryconceptsinc.com/eyetalk.html.
Langer Doorbell Light—Downloaded on Nov. 18, 2013 from http://www.youtube.com/watch?v=u9nNCm4tSYI; published at least as early as Apr. 2013.
SmartBell—Downloaded on Dec. 5, 2013 from http://smartbell.co/This_is_smartbell.html.

(56) References Cited

OTHER PUBLICATIONS

SmartBell—Downloaded on Dec. 5, 2013 from http://smartbell.co/Tech_specs.html.
SmartBell—Downloaded on Dec. 5, 2013 from http://smartbell.co/FAQ.html.
SmartBell—A Doorbell for Smartphones, published by Scrambled Brains Tech, LLC., Oct. 1, 2013.
August Smart Lock—Part 1—Downloaded on Jun. 10, 2014 from www.August.com.
August Smart Lock—Part 2—Downloaded on Jun. 10, 2014 from www.August.com.
August Smart Lock—Part 3—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—Downloaded on Jul. 15, 2014 from www.tp-link.us.
AC Adapter Spy Camera—Downloaded on Jun. 24, 2014 from andcameras.com.
FanFare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
iChime Customizable Digital Chime System—Downloaded on Nov. 7, 2014 from http://www.ichime.com/.
Philips InSight Wireless HD Baby Monitor—Downloaded on Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.
CellNock—Downloaded on Sep. 23, 2013 from http://cellnock.com/products.htm.
CellNock Index—Downloaded on Sep. 23, 2013 from http://cellnock.com/index.html.
DoorBot—Downloaded on Jun. 14, 2013 from https://christiestreet.com/products/doorbot.

IDENTITY VERIFICATION USING A SOCIAL NETWORK

CROSS-REFERENCE TO RELATED APPLICATIONS

The entire contents of the following application are incorporated by reference herein: U.S. Provisional Patent Application No. 62/016,050; filed Jun. 23, 2014; and entitled IDENTITY VERIFICATION USING A SOCIAL NETWORK.

The entire contents of the following application are incorporated by reference herein: U.S. Provisional Patent Application No. 62/016,053; filed Jun. 23, 2014; and entitled IDENTITY VERIFICATION USING A SOCIAL NETWORK AND A NAME OF A VISITOR.

The entire contents of the following application are incorporated by reference herein: U.S. Provisional Patent Application No. 62/016,057; filed Jun. 23, 2014; and entitled IDENTITY VERIFICATION OF FREQUENT AND NON-FREQUENT VISITORS.

The entire contents of the following application are incorporated by reference herein: U.S. Provisional Patent Application No. 62/135,133; filed Mar. 18, 2015; and entitled DOORBELL COMMUNICATION SYSTEMS AND METHODS.

The entire contents of the following application are incorporated by reference herein: U.S. Nonprovisional patent application Ser. No. 14/724,723; filed May 28, 2015; and entitled DOORBELL CHIME SYSTEMS AND METHODS.

The entire contents of the following applications are incorporated by reference herein: U.S. Nonprovisional patent application Ser. No. 14/612,376; filed Feb. 3, 2015; and entitled DOORBELL COMMUNICATION SYSTEMS AND METHODS; U.S. Nonprovisional patent application Ser. No. 14/502,601; filed Sep. 30, 2014; and entitled DOORBELL COMMUNICATION SYSTEMS AND METHODS; U.S. Nonprovisional patent application Ser. No. 14/492,809; filed Sep. 22, 2014; and entitled DOORBELL COMMUNICATION SYSTEMS AND METHODS; U.S. Nonprovisional patent application Ser. No. 14/275,811; filed May 12, 2014; and entitled DOORBELL COMMUNICATION SYSTEMS AND METHODS; U.S. Nonprovisional patent application Ser. No. 14/142,839; filed Dec. 28, 2013; and entitled DOORBELL COMMUNICATION SYSTEMS AND METHODS; U.S. Nonprovisional patent application Ser. No. 14/099,888; filed Dec. 6, 2013; and entitled DOORBELL COMMUNICATION SYSTEMS AND METHODS; and U.S. Nonprovisional patent application Ser. No. 14/098,772; filed Dec. 6, 2013; and entitled DOORBELL COMMUNICATION SYSTEMS AND METHODS.

The entire contents of the following application are incorporated by reference herein: International Application No. PCT/US14/47622; filed Jul. 22, 2014 with the U.S. Patent and Trademark Office; and entitled DOORBELL COMMUNICATION SYSTEMS AND METHODS.

The entire contents of the following application are incorporated by reference herein: International Application No. PCT/US14/53506; filed Aug. 29, 2014 with the U.S. Patent and Trademark Office; and entitled DOORBELL COMMUNICATION SYSTEMS AND METHODS.

BACKGROUND

1. Field

Various embodiments disclosed herein relate to devices and methods that enable remotely located individuals to communicate. Certain embodiments relate to using databases to identify visitors.

2. Description of Related Art

Homes, offices, and other buildings sometimes include communication and surveillance systems to enable friendly visitors to summon occupants of the buildings and to deter unwanted visitors. Communication and surveillance systems can include video cameras and doorbells.

Doorbells enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted. In some cases, this alerting sound can typically be heard within a short distance from the entry point or sound source. For example, a homeowner located remotely from her home likely would not be able to hear the alerting sound, and thus, would not be aware that someone is ringing her doorbell. Thus, there is a need for devices and methods to alert remotely located individuals that someone seeks the attention of the homeowner, tenant, building guardian, or steward.

SUMMARY

Several embodiments can include a method of using a doorbell to identify a visitor. The doorbell can have a speaker, a microphone, a camera, and a button. The button can be configurable to enable the visitor to sound a chime. The method can include using the doorbell to detect the visitor while the visitor is located outside of a building to which the doorbell is attached. The building can include a door having a lock that is configured to fasten the door to inhibit unauthorized entry into the building. The method can also include using the doorbell to take an image of the visitor. In some methods, the image can be a picture or a video. Some embodiments can include using the doorbell to access at least one online social network that comprises a plurality of images, and using the doorbell to search, via the at least one online social network, the plurality of images. As well, the method can include using the doorbell to determine, via facial recognition, whether the image of the visitor substantially matches at least one image of the plurality of images.

In response to a determination that the image of the visitor substantially matches at least one image of the plurality of images, some methods can further include using the doorbell to determine, via the at least one online social network, the identity of the person associated with the at least one image of the plurality of images. The identity of the person can define an identity of the visitor. The method can also include using the doorbell to send an alert to a remote computing device to notify a user of the remote computing device regarding a presence of the visitor outside the building. The alert can comprise the identity of the visitor. As well, some methods can include using the doorbell to grant or deny the visitor access to the building.

As well, in response to a determination that the image of the visitor substantially matches at least one image of the plurality of images, some methods may further include using the doorbell to automatically grant the visitor access to the building during a predetermined period of time. In some methods, the predetermined period of time is after 1700 hours local district time. Yet in some methods, the predetermined period of time is before 1700 hours local district time.

The steps of using the doorbell to access and using the doorbell to search can both occur in response to the user opening an application associated with the doorbell on the remote computing device. As well, in some methods, the steps of using the doorbell to access and using the doorbell to search can both occur in response to sending the alert to the remote computing device.

In response to a determination that the image of the visitor does not substantially match at least one image of the plurality of images, some methods can further include using the doorbell to search, via the at least one online social network, a plurality of secondary images that are associated with online social network accounts that are secondary connections to the user. As well, the method can include using the doorbell to determine, via facial recognition, whether the image of the visitor substantially matches at least one image of the plurality of secondary images.

Furthermore, in response to a determination that the image of the visitor substantially matches at least one image of the plurality of images, some methods can further include using the doorbell to access a calendar associated with the remote computing device of the user, using the doorbell to determine whether the visitor is a scheduled visitor or an unscheduled visitor, and using the doorbell to send the alert to the remote computing device, wherein the alert further comprises an indication of whether the visitor is a scheduled visitor or an unscheduled visitor.

The at least one online social network can comprise a personal social network and a professional social network. Accordingly, some methods can include using the doorbell to access a calendar associated with the remote computing device of the user and using the doorbell to determine whether the calendar includes a personal appointment or a professional appointment within plus or minus 60 minutes of a present time. In response to a determination that the calendar includes a personal appointment within plus or minus 60 minutes of the present time, the method can include using the doorbell to: 1) access the personal social network, 2) search, via the personal social network, the plurality of images and 3) determine, via facial recognition, whether the image of the visitor substantially matches at least one image of the plurality of images from the personal social network. As well, in response to a determination that the calendar includes a professional appointment within plus or minus 60 minutes of the present time, the method can include using the doorbell to: 1) access the professional social network, 2) search, via the professional social network, the plurality of images and 3) determine, via facial recognition, whether the image of the visitor substantially matches at least one image of the plurality of images from the professional social network.

In response to a determination that the image of the visitor substantially matches at least one image of the plurality of images from the personal social network, the method can include using the doorbell to send an alert to the remote computing device of the user. The alert can comprise a visitor's hometown and name of a visitor's favorite book. Furthermore, in response to a determination that the image of the visitor substantially matches at least one image of the plurality of images from the professional social network, the method can include using the doorbell to send an alert to the remote computing device of the user. The alert can comprise a visitor's job title and name of a visitor's current employer.

Furthermore, in response to a determination that the image of the visitor does not substantially match at least one image of the plurality of images, some methods can further include using the doorbell to send an alert to a remote computing device to notify a user of the remote computing device of a presence of an unknown visitor outside of the building.

In response to a determination that the image of the visitor does not substantially match at least one image of the plurality of images, some methods can include using the doorbell to capture logotype data from the image. The logotype data can comprise a graphic mark, emblem, or symbol to identify a commercial enterprise or organization. In response to a determination that the image of the visitor does not substantially match at least one image of the plurality of images, some methods can further include using the doorbell to determine an identification of the commercial enterprise or organization that is associated with the logotype data, and using the doorbell to send an alert to a remote computing device to notify a user of the remote computing device regarding a presence of a representative of the commercial enterprise or organization outside of the building.

Some methods can utilize electronic keys to gain access to a building. For example, some methods can include using the doorbell to send an electronic key to a remote computing device of the visitor. Some methods can include using the doorbell to receive instructions from the electronic key of the remote computing device of the visitor to grant the visitor access to the building.

As well, several embodiments can also include a system, such as a doorbell, for identifying a visitor. The doorbell can have a speaker, a microphone, a camera, and a button. The button can be configurable to enable the visitor to sound a chime. The doorbell can include a processor and memory coupled to the processor. The memory can comprise executable instructions that, when executed by the processor, can cause the processor to effectuate operations that include using the doorbell to detect the visitor while the visitor is located outside of a building to which the doorbell is attached. The building can comprise a door having a lock that is configured to fasten the door to inhibit unauthorized entry into the building. As well, the operations can include using the doorbell to take an image of the visitor. The image can be a picture or a video. Furthermore, the operations can include using the doorbell to access at least one online social network that comprises a plurality of images, and using the doorbell to search, via the at least one online social network, the plurality of images. As well, the operations can include using the doorbell to determine, via facial recognition, whether the image of the visitor substantially matches at least one image of the plurality of images.

Furthermore, several embodiments can include a computer-readable storage medium comprising executable instructions for using a doorbell to identify a visitor. The doorbell can have a speaker, a microphone, a camera, and a button. The button can be configurable to enable the visitor to sound a chime. When the instructions are executed by a processor, this can cause the processor to effectuate operations that include using the doorbell to detect the visitor while the visitor is located outside of a building to which the doorbell is attached. The building can comprise a door having a lock that is configured to fasten the door to inhibit unauthorized entry into the building. As well, the operations can include using the doorbell to take an image of the visitor. The image can be a picture or a video. Furthermore, the processor can effectuate operations that include using the doorbell to access at least one online social network that comprises a plurality of images, and using the doorbell to search, via the at least one online social network, the plurality of images. As well, the operations can include using the doorbell to determine, via facial recognition, whether the image of the visitor substantially matches at least one image of the plurality of images.

Some methods can include using a doorbell to identify a visitor. The doorbell can have a speaker, a microphone, a camera, and a button. The button can be configurable to enable the visitor to sound a chime. The method can include using the doorbell to detect the visitor while the visitor is located outside of a building to which the doorbell is attached. The building can comprise a door having a lock that is configured to fasten the door to inhibit unauthorized entry into the building. The method can also include using the doorbell to take an image of the visitor, wherein the image is a picture or a video and using the doorbell to provide a first audible message to the visitor. The first audible message can be configured to ask the visitor to state a visitor's name. The method can further include using the doorbell to receive a second audible message from the visitor. The second audible message can comprise the visitor's name. As well, the method can include using the doorbell to access at least one online social network that comprises a plurality of accounts. Each account of the plurality of accounts can comprise a name and at least one image. Furthermore, the method can include using the doorbell to determine, via the at least one online social network, whether an account of the plurality of accounts includes a name that substantially matches the visitor's name. In response to a determination that an account of the plurality of accounts includes a name that substantially matches the visitor's name, the method can include using the doorbell to: 1) access an image from the account and 2) use facial recognition to determine whether the image of the visitor substantially matches the image from the account.

In response to a determination that the image of the visitor substantially matches the image from the account, some methods can further include using the doorbell to send an alert to a remote computing device to notify a user of the remote computing device of a presence of the visitor outside of the building. The alert can comprise the identity of the visitor. Some methods can also include using the doorbell to grant or deny the visitor access to the building.

As well, in response to a determination that the image of the visitor substantially matches the image from the account, some methods can further include using the doorbell to automatically grant the visitor access to the building during a predetermined period of time. In some methods the predetermined period of time is from sunrise to sunset.

Several embodiments can include another method of using a doorbell to identify a visitor. The doorbell can have a speaker, a microphone, a camera, and a button. The button can be configurable to enable the visitor to sound a chime. The method can include using the doorbell to detect the visitor while the visitor is located outside of a building to which the doorbell is attached. The building can comprise a door having a lock that is configured to fasten the door to inhibit unauthorized entry into the building. As well, the method can include using the doorbell to take an image of the visitor. The image can be a picture or a video. Furthermore, the method can include using the doorbell to determine, via a database that is associated with a user of a remote computing device, whether a visitor is scheduled to arrive within plus or minus 60 minutes of a present time.

In response to a determination that a visitor is scheduled to arrive, the method can include using the doorbell to: 1) determine, via the database, a name of the scheduled visitor, 2) access at least one online social network, and 3) search, via the at least one online social network, for an account with a name of the scheduled visitor. In response to a determination that the at least one online social network includes an account with a name that substantially matches the name of the scheduled visitor, the method can include using the doorbell to access an image associated with the account of the scheduled visitor and using the doorbell to determine, via facial recognition, whether the image of the visitor substantially matches the image associated with the account of the scheduled visitor.

In some methods, the database is an email account or a calendar associated with the remote computing device. As such, in response to a determination that the image of the visitor substantially matches the image associated with the account of the scheduled visitor, some methods can further include using the doorbell to send an alert to a remote computing device to notify the user of the remote computing device regarding a presence of the scheduled visitor outside of the building. In response to a determination that the image of the visitor substantially matches the image associated with the account of the scheduled visitor, some methods can further include using the doorbell to automatically grant the visitor access to the building during a predetermined period of time. In some methods, the predetermined period of time is after 1700 hours local district time. Yet in some methods, the predetermined period of time is before 1700 hours local district time.

The steps of using the doorbell to access at least one online social network and using the doorbell to search, via the at least one online social network, for a profile with a name of the scheduled visitor can both occur in response to the user opening an application associated with the doorbell on the remote computing device. As well, the steps of using the doorbell to access at least one online social network and using the doorbell to search, via the at least one online social network, for a profile with a name of the scheduled visitor can both occur in response to sending the alert to the remote computing device.

The at least one online social network can comprise a plurality of images, and in response to a determination that the image of the visitor does not substantially match the image associated with the account of the scheduled visitor, some methods can further include using the doorbell to search, via the at least one online social network, the plurality of images, and using the doorbell to determine, via facial recognition, whether at least one image of the plurality of images substantially matches the image of the visitor.

The at least one online social network can comprise a personal social network and a professional social network. Some methods can include using the doorbell to determine, via the database, whether the scheduled visitor is associated with a personal appointment or a professional appointment. In response to a determination that the scheduled visitor is associated with a personal appointment, some methods can include using the doorbell to access and search the personal social network first, and if no match is found, then using the doorbell to access and search the professional social network second. Likewise, in response to a determination that the scheduled visitor is associated with a professional appointment, some methods can include using the doorbell to access and search the professional social network first, and if no match is found, then using the doorbell to access and search the personal social network second.

In some methods, the plurality of images can be associated with online social network accounts that are primary connections to the user. In response to a determination that the image of the visitor does not substantially match at least one image of the plurality of images, some methods can include using the doorbell to search, via the at least one online social network, a plurality of secondary images that are associated with online social network accounts that are secondary connections to the user. As well, some methods can include using the doorbell to determine, via facial recognition, whether the image of the visitor substantially matches at least one image of the plurality of secondary images. In response to a determination that the image of the visitor does not substantially match at least one image of the plurality of secondary images that are associated with online social network accounts that are secondary connections to the user, some methods can include using the doorbell to search, via the at least one online social network, a plurality of tertiary images that are associated with online social network accounts that are tertiary connections to the user. Some methods can include using the doorbell to determine, via facial recognition, whether the image of the visitor substantially matches at least one image of the plurality of tertiary images.

As well, several embodiments can include another system, such as a doorbell, for identifying a visitor. The doorbell can have a speaker, a microphone, a camera, and a button. The button can be configurable to enable the visitor to sound a chime. The doorbell can include a processor and memory coupled to the processor. The memory can comprise executable instructions that, when executed by the processor, cause the processor to effectuate operations that include using the doorbell to detect the visitor while the visitor is located outside of a building to which the doorbell is attached. The building can comprise a door having a lock that is configured to fasten the door to inhibit unauthorized entry into the building.

The operations can also include using the doorbell to take an image of the visitor. The image can be a picture or a video. As well, the processor can effectuate operations that include using the doorbell to determine, via a database that is associated with a user of a remote computing device, whether a visitor is scheduled to arrive within plus or minus 60 minutes of a present time. In response to a determination that a visitor is scheduled to arrive, the operations can also include using the doorbell to: 1) determine, via the database, a name of the scheduled visitor, 2) access at least one online social network, and 3) search, via the at least one online social network, for an account with a name of the scheduled visitor. In response to a determination that the at least one online social network includes an account with a name that substantially matches the name of the scheduled visitor, the operations can include using the doorbell to access an image associated with the account of the scheduled visitor and using the doorbell to determine, via facial recognition, whether the image of the visitor substantially matches the image associated with the account of the scheduled visitor.

Furthermore, several embodiments can include another computer-readable storage medium comprising executable instructions for using a doorbell to identify a visitor. The doorbell can have a speaker, a microphone, a camera, and a button. The button can be configurable to enable the visitor to sound a chime. When the instructions are executed by a processor, this can cause the processor to effectuate operations comprising using the doorbell to detect the visitor while the visitor is located outside of a building to which the doorbell is attached. The building can comprise a door having a lock that is configured to fasten the door to inhibit unauthorized entry into the building. The operations can further include using the doorbell to take an image of the visitor. The image can be a picture or a video.

As well, the processor can effectuate operations that include using the doorbell to determine, via a database that is associated with a user of a remote computing device, whether a visitor is scheduled to arrive within plus or minus 60 minutes of a present time. In response to a determination that a visitor is scheduled to arrive, the operations can include using the doorbell to: 1) determine, via the database, a name of the scheduled visitor, 2) access at least one online social network, and 3) search, via the at least one online social network, for an account with a name of the scheduled visitor. In response to a determination that the at least one online social network includes an account with a name that substantially matches the name of the scheduled visitor, the operations can include using the doorbell to access an image associated with the account of the scheduled visitor and using the doorbell to determine, via facial recognition, whether the image of the visitor substantially matches the image associated with the account of the scheduled visitor.

Several embodiments can include yet another method for using a doorbell to identify a visitor. The doorbell can have a speaker, a microphone, a camera, and a button. The button can be configurable to enable the visitor to sound a chime. The method can include using the doorbell to detect the visitor while the visitor is located outside of a building to which the doorbell is attached. The building can include a door having a lock that is configured to fasten the door to inhibit unauthorized entry into the building. The method can also include using the doorbell to take an image of the visitor. The image can be a picture or a video. As well, the method can include using the doorbell to access a remote database and determine, using facial recognition, whether the image of the visitor matches a visitor who has previously visited the building.

In response to a determination that the visitor has not previously visited the building, the operations can include using the doorbell to: 1) access at least one online social network that comprises a plurality of images, 2) search, via the at least one online social network, the plurality of images and use facial recognition to determine whether the image of the visitor substantially matches at least one image of the plurality of images, 3) send an alert to a remote computing device to notify a user of the remote computing device of a presence of the visitor outside of the building and the visitor's identity, and 4) receive instructions from the user to either grant or deny the visitor access to the building. As well, in response to a determination that the visitor has previously visited the building, the method can include using the doorbell to automatically grant the visitor access to the building.

In some methods, using the doorbell to automatically grant the visitor access to the building can occur during a predetermined period of time. In some methods the predetermined period of time is after 1700 hours local district time. Yet, in some methods the predetermined period of time is before 1700 hours local district time.

In some methods using the doorbell to: 1) access at least one online social network that comprises a plurality of images, 2) search, via the at least one online social network, the plurality of images and use facial recognition to determine whether the image of the visitor substantially matches at least one image of the plurality of images, and 3) send an alert to a remote computing device to notify a user of the remote computing device of a presence of the visitor outside of the building and the visitor's identity can occur before the visitor is within 30 feet of the building. As well, using the doorbell to automatically grant the visitor access to the building also can occur before the visitor is within 30 feet of the building. Furthermore, in some methods, using the doorbell to receive instructions from the user to either grant the visitor access to the building or deny the visitor access to the building, can occur before the visitor is within 5 feet of the building.

Yet, in some methods, using the doorbell to: 1) access at least one online social network that comprises a plurality of images, 2) search, via the at least one online social network, the plurality of images and use facial recognition to determine whether the image of the visitor substantially matches at least one image of the plurality of images, and 3) send an alert to a remote computing device to notify a user of the remote computing device of a presence of the visitor outside of the building and the visitor's identity, can occur before the visitor is within 100 feet of the building. As well, using the doorbell to automatically grant the visitor access to the building also can occur before the visitor is within 100 feet of the building. In some methods, using the doorbell to receive instructions from the user to either grant the visitor access to the building or deny the visitor access to the building can occur before the visitor is within 30 feet of the building.

In response to a determination that the visitor has previously visited the building one time, some methods can include using the doorbell to: 1) access at least one online social network that comprises a plurality of images, 2) search, via the remote database, the plurality of images and use facial recognition to determine whether the image of the visitor substantially matches at least one image of the plurality of images, 3) send an alert to the remote computing device of the user, wherein the alert comprises a notification of the presence of the visitor outside of the building, the visitor's identity, and that the visitor has previously visited the building one time, and 4) receive instructions from the user to either grant or deny the visitor access to the building.

In response to receiving instructions from the user to grant the visitor access to the building, and when the visitor is within 3 feet of the building, some methods can include using the doorbell to provide a first audible message to the visitor. The first audible message can comprise a greeting and the visitor's first name. In response to a determination that the visitor has previously visited the building, and when the visitor is within 3 feet of the building, some methods can include using the doorbell to provide a second audible message to the visitor. The second audible message can comprise a greeting and the visitor's first name. In some methods, the first audible message is the same as the second audible message. Yet, in some methods, the first audible message and the second audible message are different. In some methods the first audible message further can include a joke, and the second audible message can include a rhetorical question.

As well, several embodiments can include yet another system, such as a doorbell, for identifying a visitor. The doorbell can have a speaker, a microphone, a camera, and a button. The button can be configurable to enable the visitor to sound a chime. The doorbell can include a processor and memory coupled to the processor. The memory can comprise executable instructions that, when executed by the processor, can cause the processor to effectuate operations that include using the doorbell to detect the visitor while the visitor is located outside of a building to which the doorbell is attached. The building can include a door having a lock that is configured to fasten the door to inhibit unauthorized entry into the building. The operations can include using the doorbell to take an image of the visitor. The image can be a picture or a video.

The processor can also effectuate operations that include using the doorbell to access a remote database and determine, using facial recognition, whether the image of the visitor matches a visitor who has previously visited the building. In response to a determination that the visitor has not previously visited the building, the operations can include using the doorbell to: 1) access at least one online social network that comprises a plurality of images, 2) search, via the at least one online social network, the plurality of images and use facial recognition to determine whether the image of the visitor substantially matches at least one image of the plurality of images, 3) send an alert to a remote computing device to notify a user of the remote computing device of a presence of the visitor outside of the building and the visitor's identity, and 4) receive instructions from the user to either grant or deny the visitor access to the building. In response to a determination that the visitor has previously visited the building, the operations can include using the doorbell to automatically grant the visitor access to the building.

Furthermore, several embodiments can include yet another computer-readable storage medium comprising executable instructions for using a doorbell to identify a visitor. The doorbell can have a speaker, a microphone, a camera, and a button. The button can be configurable to enable the visitor to sound a chime, When the instructions are executed by a processor, this can cause the processor to effectuate operations that include using the doorbell to detect the visitor while the visitor is located outside of a building to which the doorbell is attached. The building can comprise a door having a lock that is configured to fasten the door to inhibit unauthorized entry into the building. The operations can include using the doorbell to take an image of the visitor. The image can be a picture or a video.

The processor can also effectuate operations that include using the doorbell to access a remote database and determine, using facial recognition, whether the image of the visitor matches a visitor who has previously visited the building. In response to a determination that the visitor has not previously visited the building, the operations can include using the doorbell to: 1) access at least one online social network that comprises a plurality of images, 2) search, via the at least one online social network, the plurality of images and use facial recognition to determine whether the image of the visitor substantially matches at least one image of the plurality of images, 3) send an alert to a remote computing device to notify a user of the remote computing device of a presence of the visitor outside of the building and the visitor's identity, and 4) receive instructions from the user to either grant or deny the visitor access to the building. In response to a determination that the visitor has previously visited the building, the operations can include using the doorbell to automatically grant the visitor access to the building.

As well, any of the methods described in this disclosure can be implemented with any combination of systems and/or computer-readable storage media. For example, any method can be implemented using a system, such as a doorbell, for identifying a visitor. The doorbell can include a processor and memory coupled to the processor. The memory can comprise executable instructions that, when executed by the processor, can cause the processor to effectuate operations that include any of the methods described in this disclosure. As well, any method can be implemented using a computer-readable storage medium that can include executable instructions for using a doorbell to identify a visitor. When the instructions are executed by a processor, this can cause the processor to effectuate operations that include any of the methods described in this disclosure.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Homeowners may often have guests visit their homes for various personal or professional reasons. Oftentimes, these guests may be connected to the homeowner through various online social networks 420, such as Facebook®, LinkedIn®, Twitter®, Google+®, and the like. The online social networks 420 may comprise a database of facial images that can be accessed remotely. Accordingly, a captured facial image of a visitor who approaches a home may be compared to the facial images accessed through an online social network 420 to determine whether there is a match. Therefore, this system may be able to positively identify a visitor with little to no interaction by the homeowner.

Figure 1:
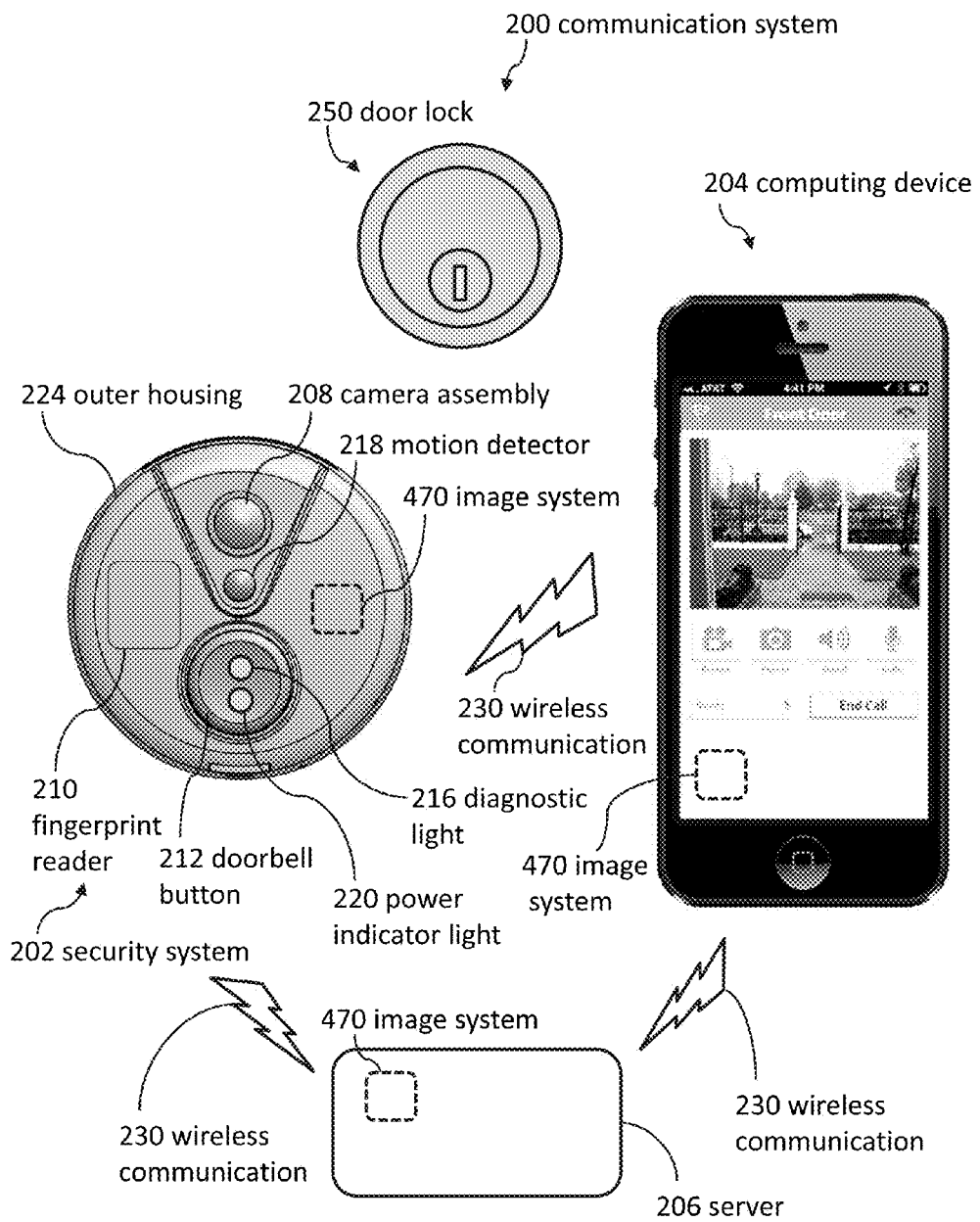
FIG. 1 illustrates a front view of a communication system, according to some embodiments.

FIG. 1 illustrates a security system 202 (e.g., a doorbell) that includes a camera assembly 208. When a visitor approaches the security system 202 (e.g., rings a doorbell 212), the security system 202 can send a wireless notification to a computing device 204 that is located remotely relative to the security system 202. For example, the homeowner may be at the grocery store, but still able to receive a wireless notification that a visitor is at the front door of the home.

The homeowner can verify the identity of the visitor as explained in more detail below. For example, the owner can see the identity of the visitor on the computing device 204, the owner can then grant the visitor access to the property (e.g., by unlocking the door lock 250 to let the visitor inside the building). The security system 202 can be configured such that it can unlock the door lock 250. In some embodiments, the security system 202 wirelessly controls the door lock 250. As well, in some embodiments when a visitor has visited the property and been granted access on more than one occasion, the system can be configured to automatically grant the visitor access to the building, with limited or no interaction from the homeowner.

The door lock 250 can include a deadbolt or other locking mechanism that locks and unlocks a door in response to remote commands. For example, the security system 202 can notify the door lock 250 to lock and unlock the door. The door lock 250 can be controlled by a remote computing device 204 (e.g., a smartphone). Example door locks 250 include Lockitron made by Apigy Inc., the August Smart Lock made by Yves Behar and Jason Johnson, electronic locks made by Schlage (an Allegion company), and the Kevo lock made by Kwikset (a division of Spectrum Brands Holdings).

It should be appreciated that the term "homeowner" can be used to describe a user, resident, renter, tenant, building owner, host, or anyone who occupies a home. It should also be appreciated that the term "guest" can describe a visitor, attendee, invitee, lodger, or anyone who can approach a home. Furthermore, it should also be appreciated that the term "home" can be used to describe a house, residence, dwelling, abode, habitat, domicile, quarters, building, or any type of structure configured to accommodate homeowners and guests. As such, any of these terms can be used interchangeably with other like terms throughout this document.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

FIG. 1 illustrates a front view of a communication system embodiment. The communication system 200 can include a security system 202 (e.g., a doorbell) and a computing device 204. Although the illustrated security system 202 includes many components in one housing, several security system embodiments include components in separate housings. The security system 202 can include a camera assembly 208 and a doorbell button 212. The camera assembly 208 can be a video camera, which in some embodiments is a webcam. The security system 202 can include a diagnostic light 216 and a power indicator light 220. In some embodiments, the diagnostic light 216 is a first color (e.g., blue) if the security system 202 and/or the communication system 200 is connected to a wireless Internet network and is a second color (e.g., red) if the security system 202 and/or the communication system 200 is not connected to a wireless Internet network. In some embodiments, the power indicator 220 is a first color if the security system 202 is connected to a power source. The power source can be power supplied by the building to which the security system 202 is attached. In some embodiments, the power indicator 220 is a second color or does not emit light if the security system 202 is not connected to the power source.

The security system 202 (e.g., a doorbell) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell) to communicate with the computing device 204. Some embodiments enable communication via cellular and/or WiFi networks. Some embodiments enable communication via the Internet. Several embodiments enable wired communication between the security system 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204 (e.g., a smartphone, a desktop computer, a tablet computer, a laptop computer).

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
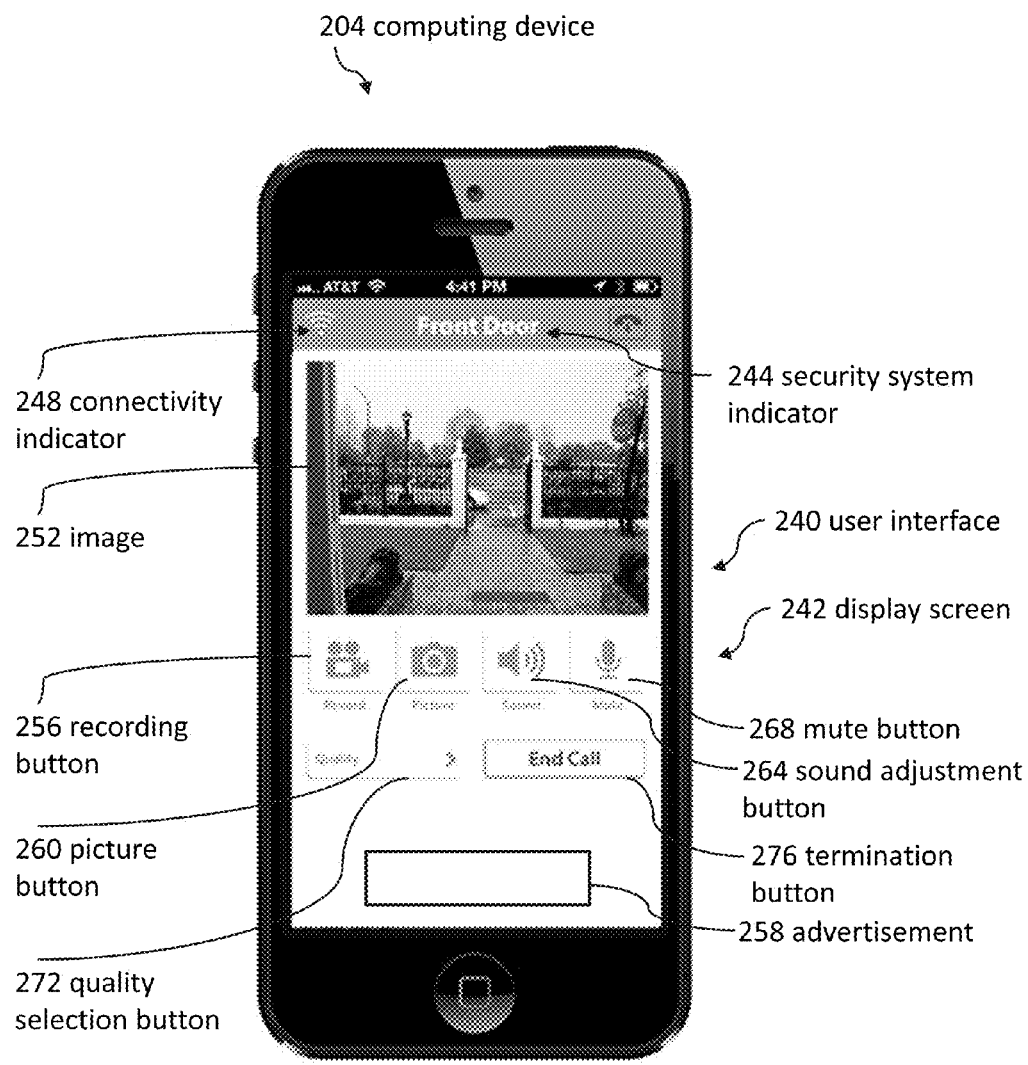
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device 204 is in communication with a security system, the Internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device 204. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device 204 that stores information from the security system 202 and/or from the computing device 204. In some embodiments, the remote server 206 is located in a data center.

In some embodiments, the computing device 204 and/or the remote server 206 attempts to communicate with the security system 202. If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log into an "app," website, and/or software on a computing device (e.g., mobile computing device, smartphone, tablet, laptop computer, desktop computer) to adjust the security system settings discussed herein.

In some embodiments, a computing device 204 can enable a user to watch live video and/or hear live audio from a security system 202 due to the user's request rather than due to actions of a visitor. Some embodiments include a computing device 204 initiating a live video feed (or a video feed that is less than five minutes old).

In some embodiments, the user interface 240 displays an image 252 such as a still image or a video of an area near and/or in front of the security system 202. The image 252 can be taken by the camera assembly 208 and stored by the security system 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the security system 202 to the computing device 204 and/or from the computing device 204 to the security system 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a button 276, such as a termination button, to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is a termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system 202 and to stop emitting sounds recorded by the security system 202.

In some embodiments, the user interface 240 opens as soon as the security system 202 detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system 202. The methods can include causing the user interface to display on a remote computing device 204 due to the detection of the visitor (e.g., with or without user interaction). The methods can include displaying video from the security system 202 and/or audio from the security system 202 before the user accepts two-way communication with the visitor. The methods can include displaying video from the security system 202 and/or audio from the security system 202 before the user accepts the visitor's communication request. The methods can include the computing device 204 simultaneously asking the user if the user wants to accept (e.g., answer) the communication request and displaying audio and/or video of the visitor. For example, in some embodiments, the user can see and hear the visitor via the security system 202 before opening a means of two-way communication with the visitor.

In some embodiments, the software includes means to start the video feed on demand. For example, a user of the computing device 204 might wonder what is happening near the security system 202. The user can open the software application (e.g. "app") on the computing device 204 and instruct the application to show live video and/or audio from the security device 202 even if no event near the security system 202 has triggered the communication.

In several embodiments, the security device 202 can be configured to record when the security device 202 detects movement and/or the presence of a person. The user of the computing device 204 can later review all video and/or audio records when the security device 202 detected movement and/or the presence of a person.

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

In some embodiments, data captured by the security system 202 and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

Figure 3:
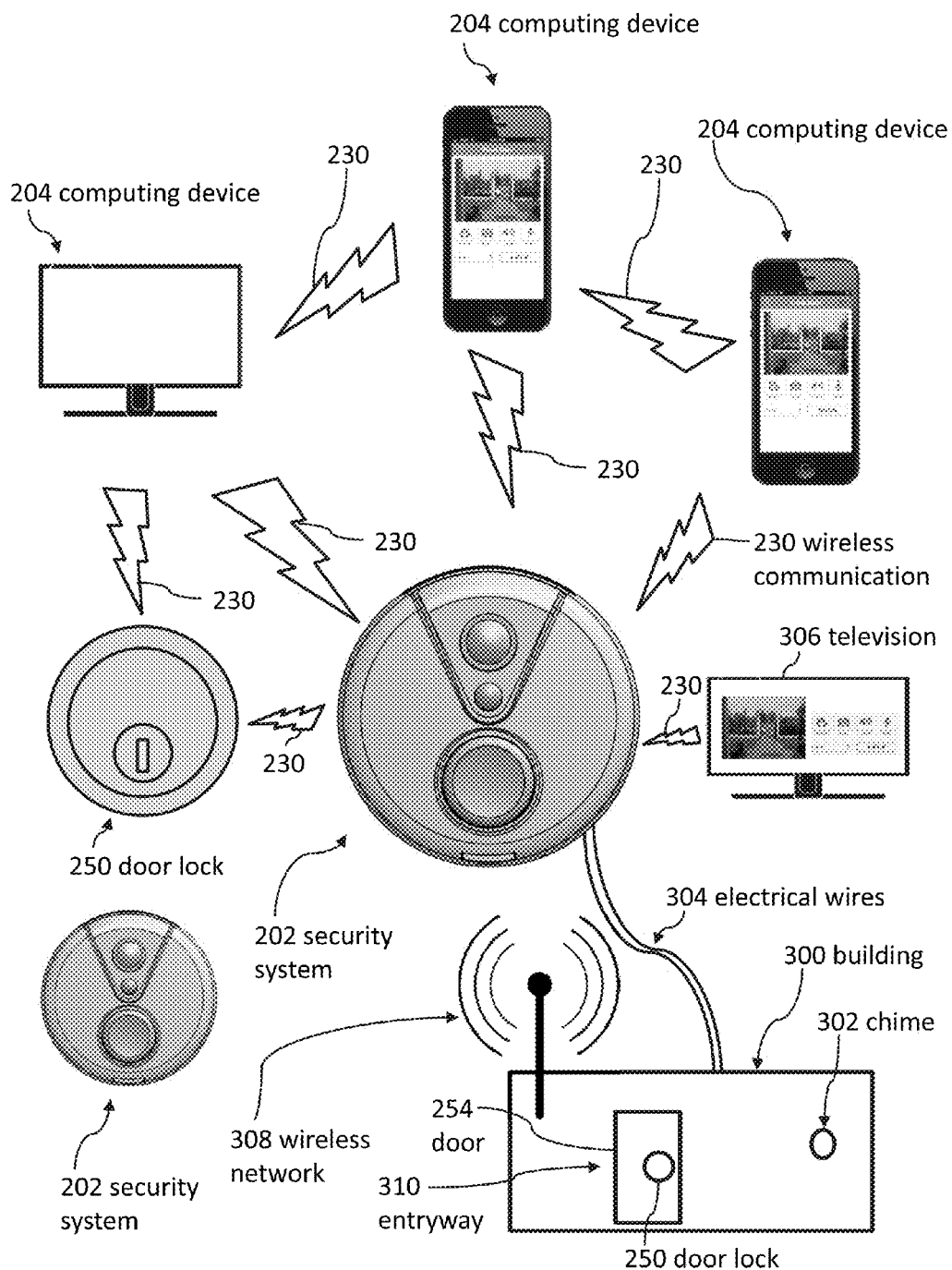
FIG. 3 illustrates an embodiment in which a security system is connected to a building, according to some embodiments.

FIG. 3 illustrates an embodiment in which a security system 202 is connected to a building 300, which can include an entryway 310 that has a door 254. A door lock 250 can be configured to lock and unlock the door 254. Electrical wires 304 can electrically couple the security system 202 to the electrical system of the building 300 such that the security system 202 can receive electrical power from the building 300.

A wireless network 308 can allow devices to wirelessly access the Internet. The security system 202 can access the Internet via the wireless network 308. The wireless network 308 can transmit data from the security system 202 to the Internet, which can transmit the data to remotely located computing devices 204. The Internet and wireless networks can transmit data from remotely located computing devices 204 to the security system 202. In some embodiments, a security system 202 connects to a home's WiFi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202.

In some embodiments, the security system 202 can communicate (e.g., wirelessly 230) with a television 306, which can be a smart television. Users can view the television 306 to see a visitor and/or talk with the visitor.

Visitor Identification Embodiments

Many embodiments can automatically identify a visitor who approaches a building. These embodiments can access at least one online social network 420, comprising a plurality of images, and then utilize various technologies, like facial recognition, to search the plurality of images to identify the visitor. The visitor can be identified by any plurality of identifying information such as the visitor's name, hometown and the like. Because the identifying information available through the at least one online social network 420 may be not be 100% accurate, it should be appreciated that the identifying information provided by these embodiments can be limited by the accuracy of the facial recognition technology and the accuracy of the identifying information available through the at least one online social network 420.

Referring now to FIG. 1, the camera assembly 208 can be configured to visually identify visitors through machine vision and/or image recognition. For example, the camera assembly 208 can take an image of the visitor. Software run by any portion of the system can then compare select facial features from the image to a plurality of images from the at least one online social network 420. In some embodiments, the select facial features include dimensions based on facial landmarks. For example, the distance between a visitor's eyes; the triangular shape between the eyes and nose; and the width of the mouth can be used to characterize a visitor and then to compare the visitor's characterization to a database of characterization information, such as the plurality of images from the at least one online social network 420, to match the visitor's characterization to an identity (e.g., an individual's name, authorization status, and classification). Some embodiments can use three-dimensional visitor identification methods.

Some embodiments include facial recognition such that the camera assembly 208 waits until the camera assembly 208 has a good view of the person located near the security system 202 and then captures an image of the person's face.

Figure 4:
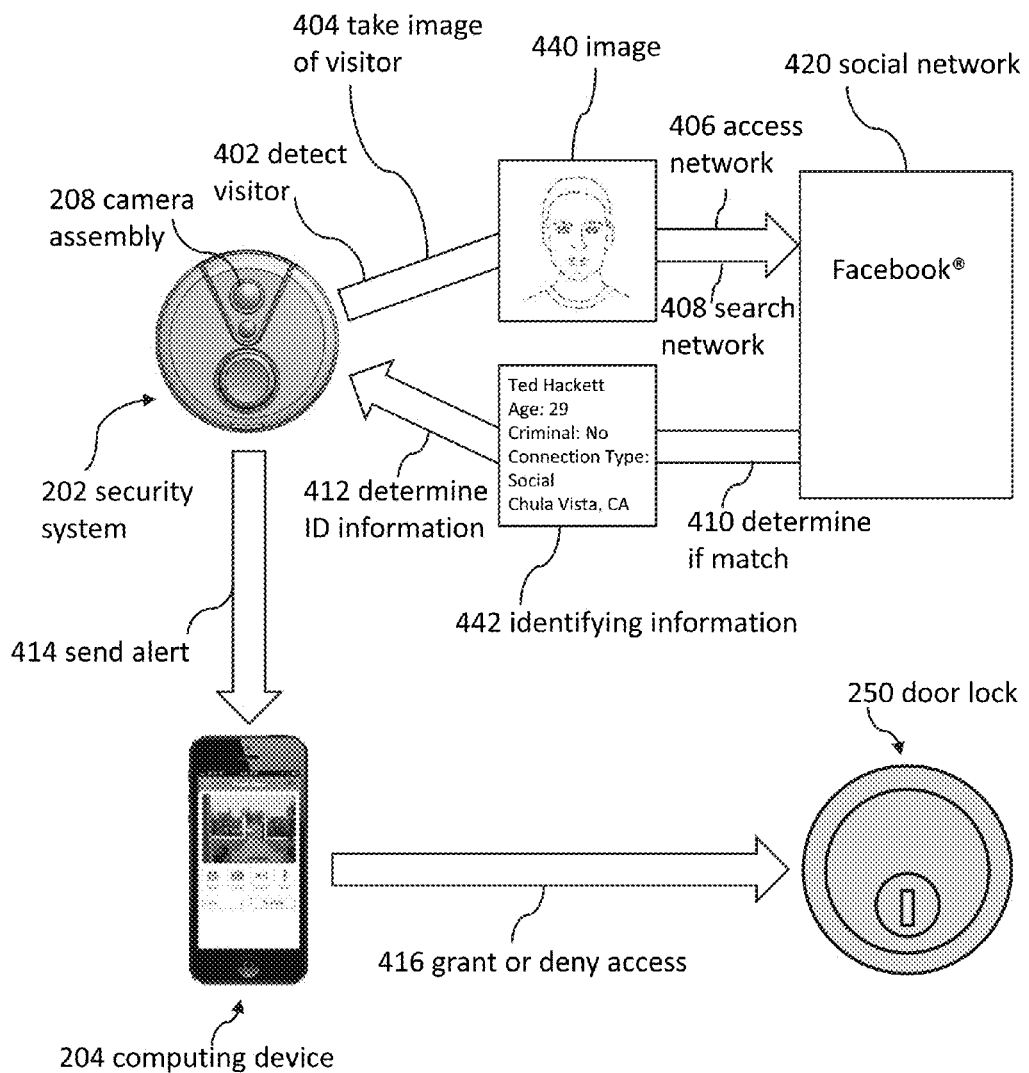
FIG. 4 illustrates diagrammatic views of identity verification methods, according to some embodiments.

For example, as illustrated in FIG. 4, an embodiment can perform a method for using a doorbell 202 to identify a visitor. The doorbell 202 can have a speaker, a microphone, a camera 208, and a button 212. The button 212 can be configurable to enable the visitor to sound a chime 302. In some embodiments, the doorbell 202 can include a speaker for providing an audible message to the visitor.

Some embodiments can include using the doorbell 202 to detect the visitor while the visitor is located outside of a building 300 to which the doorbell 202 is attached (step 402). The building 300 can comprise a door 254 having a lock 250 that is configured to fasten the door 254 to inhibit unauthorized entry into the building 300. The method can also include using the doorbell 202 to take an image 440 of the visitor (step 404). It should be appreciated that the image 440 can be a picture, video, or any other type of media to identify a visitor.

With continued reference to FIG. 4, the method can also include accessing at least one online social network 420 that comprises a plurality of images (step 406). It should be appreciated that the at least one online social network 420 can comprise Facebook®, LinkedIn®, Twitter®, Google+®, MySpace®, and the like. As well, some embodiments can include searching, via the at least one online social network 420, the plurality of images (step 408) and using facial recognition to determine whether the image 440 of the visitor, as taken by the doorbell 202, substantially matches at least one image 440 of the plurality of images (step 410). It should be appreciated that the accessing and searching steps can occur in response to the user of the remote computing device 204 performing any type of action. For example, in some embodiments, the accessing and searching steps can occur in response to the user opening an application associated with the doorbell 202 on the remote computing device 204. In some embodiments, the accessing and searching steps can occur in response to the doorbell 202 sending an alert to the remote computing device 204, perhaps an alert notifying a user of the remote computing device 204 of a presence of the visitor outside of the building 300.

It should be appreciated that while many of the method steps described in this disclosure can be recited as for example, "determining whether the image . . . " it should be appreciated that these method steps can be implemented by the doorbell or any other piece of hardware implemented in the doorbell, such as a processor.

In some embodiments, in response to a determination whether the image 440 of the visitor substantially matches at least one image of the plurality of images, the method can further include determining, via the at least one online social network 420, the identity of the person associated with the at least one image of the plurality of images (step 412). It should be appreciated that the identity of the person defines an identity of the visitor. As well, some embodiments can include sending an alert to a remote computing device 204 to notify a user of the remote computing device 204 of a presence of the visitor outside of the building 300 (step 414). It should be appreciated that the alert can comprise the identity of the visitor. The identity of the visitor can include any identifying information 442 such as name, age, current and/or past occupation(s), hometown, hobbies, favorite books, favorite sports, favorite sayings, connection type (e.g. social, work colleague, etc.), and any other information that would help the user of the remote computing device 204 identify the visitor. As well, it should be appreciated that the method can further include granting or denying the visitor access to the building (step 416).

In response to a determination that the image of the visitor substantially matches at least one image of the plurality of images, the method can further comprise using the doorbell to automatically grant the visitor access to the building during a predetermined period of time. The predetermined period of time can be any time of day, or any time as determined by the user of the remote computing device 204. For example, in some embodiments, the predetermined period of time is any time of day after 1700 hours of the local district time. In some embodiments, the predetermined period of time is any time of day before 1700 hours of the local district time.

As well, the doorbell can be configured to automatically grant access to predetermined visitors. For example, if the homeowner (or user of the remote computing device 204) is away on vacation and is letting a friend housesit while the homeowner is away, the homeowner can configure the system to allow the friend automatic access to the home during the period that the homeowner is away on vacation.

Figure 5:
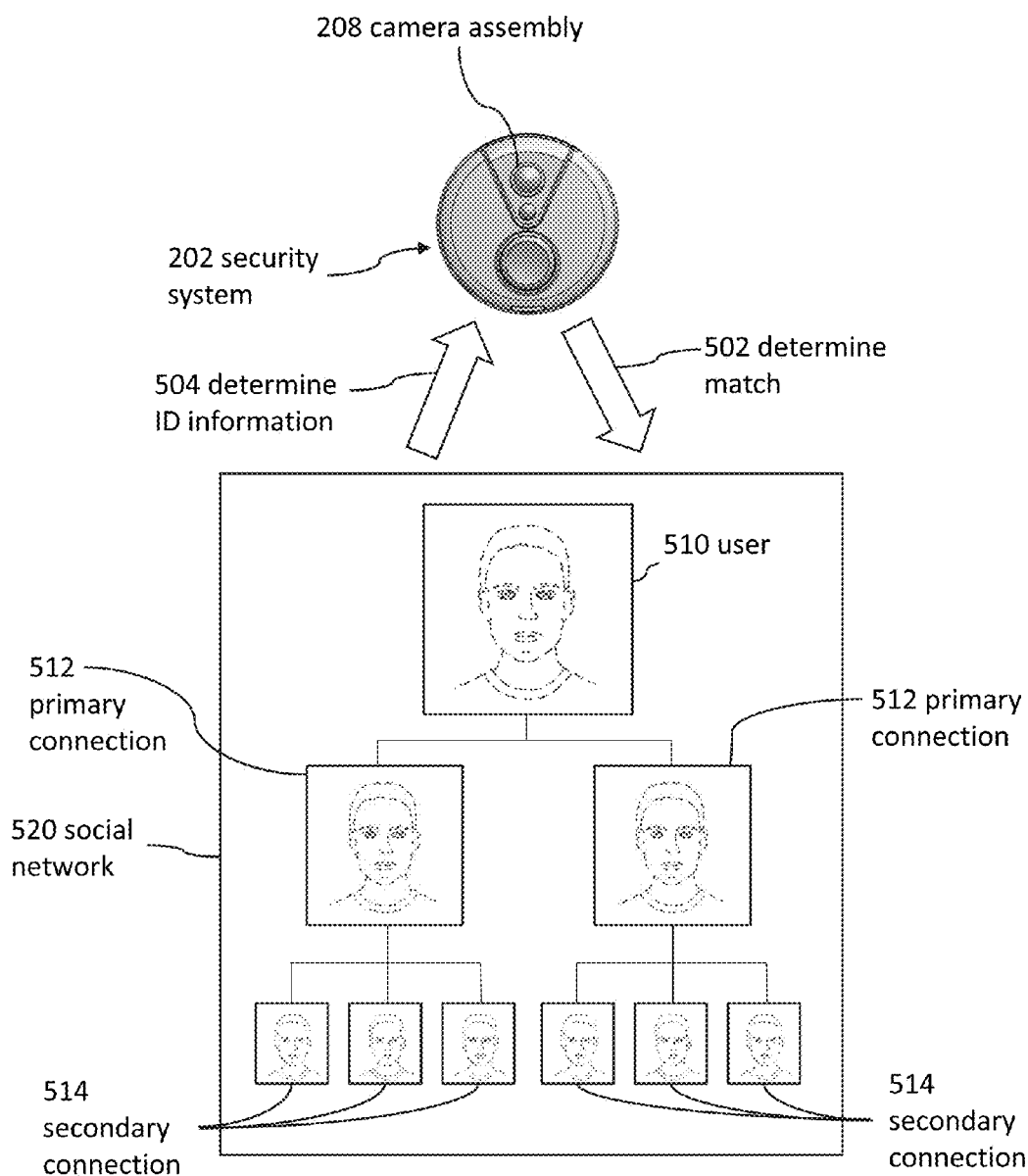
FIG. 5 illustrates a connection tree of primary and secondary connections to a user within a social network.

As illustrated in FIG. 5, with respect to the user 510 of the remote computing device 204, the online social network 520 can include a pyramid-like connection structure. In this manner, the user 510 of the remote computing device 204 can be directly connected to one or more primary connections 512. As well, the user 510 of the remote computing device 204 can be indirectly connected to one or more secondary connections 514. In this manner, secondary connections are primary connections with respect to the primary connections 512 of the user 510, but are not primary connections with respect to the user 512. As such, it can be said that the secondary connections 514 are indirectly connected to the user 510. As such, in some embodiments, the plurality of images can be associated with online social network 520 accounts that are primary connections 512 to the user 510. In response to a determination that the image of the visitor does not substantially match at least one image of the plurality of images, some embodiments can include searching, via the at least one online social network 520, a plurality of secondary images that are associated with online social network accounts that are secondary connections 514 to the user 510 and using facial recognition to determine whether the image of the visitor substantially matches at least one image of the plurality of secondary images. It should also be appreciated that the pyramid-like structure does not end at secondary connections. Some embodiments can include steps to search tertiary connections and beyond.

Figure 6:
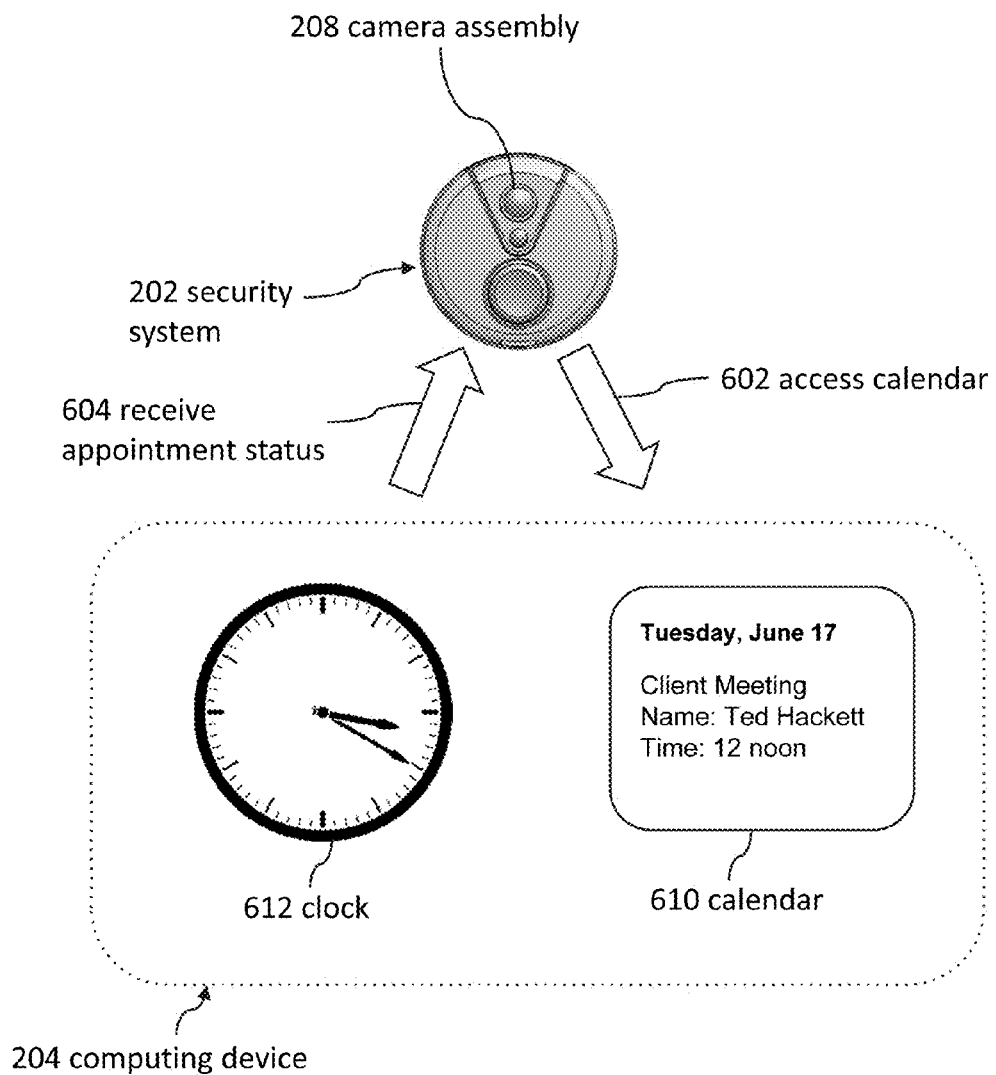
FIGS. 6-10 illustrate diagrammatic views of identity verification methods, according to some embodiments.

In response to a determination that the image of the visitor substantially matches at least one image of the plurality of images, as illustrated in FIG. 6, some embodiments may include a method of accessing a calendar associated with the remote computing device 204 of the user and determining whether the visitor is a scheduled visitor or an unscheduled visitor (step 602). The method may also include sending the alert to the remote computing device 204. It should be appreciated that the alert may further comprise an indication of whether the visitor is a scheduled visitor or an unscheduled visitor. As well, the alert may include any other information in regards to the meeting, such as the meeting time, agenda, attendees, and the like.

With regards to the online social network, it should be appreciated that the at least one online social network may comprise a personal social network and a professional social network. Returning to the discussion of FIG. 6, it should also be appreciated that step 602 may be performed in a variety of ways in this and other embodiments. For example, some embodiments may include accessing a calendar associated with the remote computing device 204 of the user and determining whether the calendar includes a personal appointment or a professional appointment within a predetermined time of a present time (step 602), as according to a clock 612 that is associated with the remote computing device 204. It should be appreciated that the predetermined time may be any amount of time plus or minus the present time, such as plus or minus 15 minutes, plus or minus 30 minutes, plus or minus 60 minutes, etc.

With continued reference to FIG. 6, in response to a determination that the calendar includes a personal appointment within plus or minus a predetermined time of the present time (step 604), the method may also include: 1) accessing the personal social network, 2) searching, via the personal social network, the plurality of images and 3) using facial recognition to determine whether the image of the visitor substantially matches at least one image of the plurality of images from the personal social network. It should be appreciated that a personal social network may be any type of personal social network that is predominantly used for personal purposes, such as Facebook®, Twitter®, and the like. Some personal social networks may be also be used as professional social networks, such as Twitter®. Ultimately, the determination of whether a social network is personal or professional can be determined by the homeowner (e.g. the user of the remote computing device 204).

Alternatively, in response to a determination that the calendar includes a professional appointment within plus or minus a predetermined time of the present time, the method may also include: 1) accessing the professional social network, 2) searching, via the professional social network, the plurality of images and 3) using facial recognition to determine whether the image of the visitor substantially matches at least one image of the plurality of images from the professional social network. Furthermore, it should be appreciated that the professional social network may be any type of professional social network that is predominantly used for professional purposes, such as LinkedIn®, Plaxo®, and the like.

In some embodiments, the identity of the visitor will not be able to be determined by the doorbell 202. In response to a determination that the image of the visitor does not substantially match at least one image of the plurality of images, some embodiments can include sending an alert to a remote computing device 204 to notify a user of the remote computing device 204 of a presence of an unknown visitor outside of the building 300.

Figure 7:
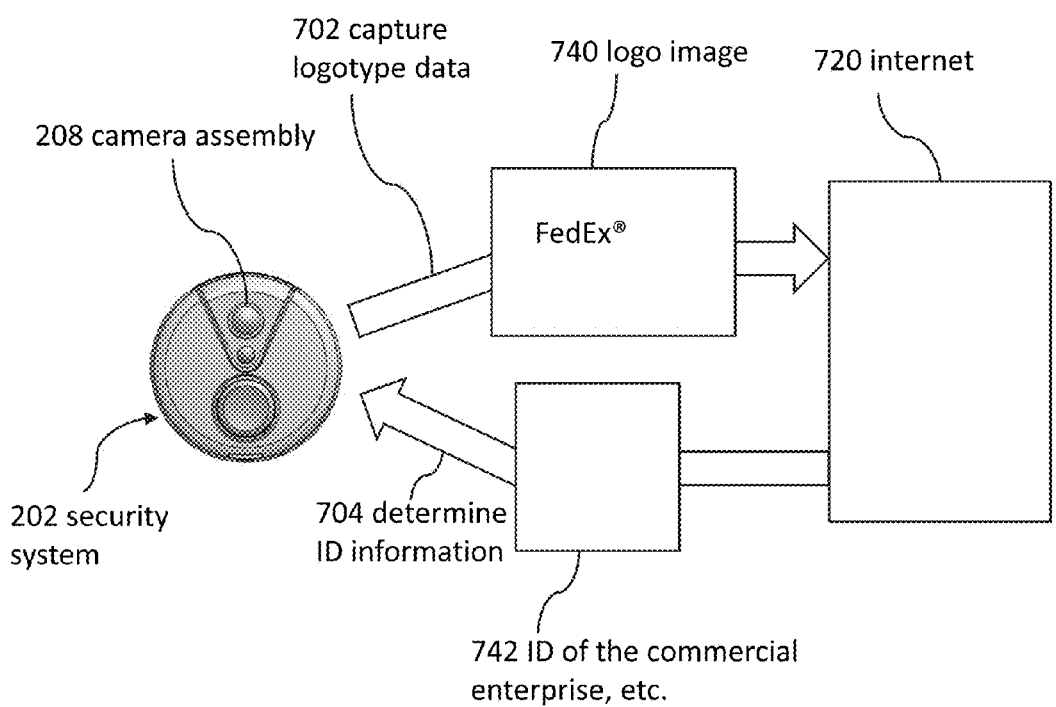

If the identity of the visitor is unknown, some embodiments may seek other information from the visitor in order to determine if the visitor is an agent or representative of a company, etc. For example, as illustrated in FIG. 7, in response to a determination that the image of the visitor does not substantially match at least one image of the plurality of images, some embodiments can include capturing logotype data from the image (step 702). The logotype data can be a graphic mark, emblem, or symbol to identify a commercial enterprise or organization, as illustrated by logo image 740, as shown in FIG. 7. It should be appreciated that the logotype data can be found on the visitor's shirt, hat, jacket, and any other article of clothing or personal property that may include a logo of a company or organization. Furthermore, the method can also include accessing the Internet 720 and determining an identification (742) of the commercial enterprise or organization that is associated with the logotype data (step 704). As well, some embodiments can include sending an alert to a remote computing device 204 to notify a user of the remote computing device 204 regarding a presence of a representative of the commercial enterprise or organization outside of the building 300.

Some embodiments can include searching the at least one online social network using a known visitor's name, as provided by the visitor, and then determining whether an image associated with an online account of the visitor matches an image taken by the doorbell. Rather than searching the user's entire list of primary connections for a facial image that matches the image taken by the doorbell 202, this method may be able to reduce the time to search for a match, and ultimately the amount of time that the visitor has to wait. The embodiment can include a method for using a doorbell 202 to identify a visitor. The doorbell 202 can have a speaker, a microphone, a camera 208, and a button 212. The button 212 can be configurable to enable the visitor to sound a chime 302. The method can include using the doorbell 202 to detect the visitor while the visitor is located outside of a building 300 to which the doorbell 202 is attached. The building 300 can include a door 254 having a lock 250 that is configured to fasten the door 254 to inhibit unauthorized entry into the building 300.

The method can also include using the doorbell 202 to take an image of the visitor. It should be appreciated that the image can be a picture or a video. Furthermore, the method can include using the doorbell to provide a first audible message to the visitor. The first audible message can be configured to provide a greeting and/or solicit any type of information from the visitor, such as the visitor's name. Accordingly, the method can include using the doorbell to receive a second audible message from the visitor. As well, the second audible message can include any type of verbal statement in response to the doorbell's first audible message. For example, the second audible message can include the visitor's name and/or any other type of identifying information.

Once the doorbell 202 receives the solicited information from the visitor, in the form of the second audible message, the method can then include using the doorbell 202 to access at least one online social network that comprises a plurality of accounts. The method can include using the doorbell 202 to determine, via the at least one online social network, whether an account of the plurality of accounts includes a name that substantially matches the visitor's name. It should be appreciated that the second audible message may include a nickname or, vice versa, a more formal name. Accordingly, the method may not produce an exact match, but can determine a name that most closely matches the name associated with the account. For example, the second audible message provided by the visitor might be "Jimmy Williams." However, the name of the account from the online social network might be "James Frederick Williams." The doorbell 202 can be configured to recognize that "Jimmy" is a nickname or an informal version of the name "James." As well, the doorbell 202 can be configured to search for middle names when they are provided, or ignore middle names from the search results when they are not provided by the visitor.

In some embodiments, the doorbell 202 might discover there are multiple accounts that include the same or similar names. For example, the doorbell 202 might determine that the user has two primary connections with the names "James Frederick Williams" and "Jimbo Williams." The doorbell 202 can be configured to provide a third audible message to the visitor to ask the visitor to select his name from the list of discovered names and clarify the visitor's identity. However, in some embodiments the doorbell 202 might not provide a third audible message and instead access images from both the "James Frederick Williams" and "Jimbo Williams" accounts and then using the doorbell to determine, via facial recognition, whether the image of the visitor substantially matches either of the accounts.

However, in response to a determination that an account of the plurality of accounts includes a name that substantially matches the visitor's name, some methods can include using the doorbell 202 to: 1) access an image from the account and 2) use facial recognition to determine whether the image of the visitor substantially matches the image from the account. In response to a determination that the image of the visitor substantially matches the image from the account, some methods can further include using the doorbell 202 to send an alert to a remote computing device 204 to notify a user of the remote computing device 204 of a presence of the visitor outside of the building 300. It should be appreciated that the alert can comprise the identity of the visitor. As well, the method can include using the doorbell 202 to grant or deny the visitor access to the building 300.

In response to a determination that the image of the visitor substantially matches the image from the account, some methods can further include using the doorbell 202 to automatically grant the visitor access to the building 300 during a predetermined period of time. It should be appreciated that the predetermined period of time can be any time of day or duration of time. For example, the predetermined period of time can be from sunrise to sunset.

Figure 8:
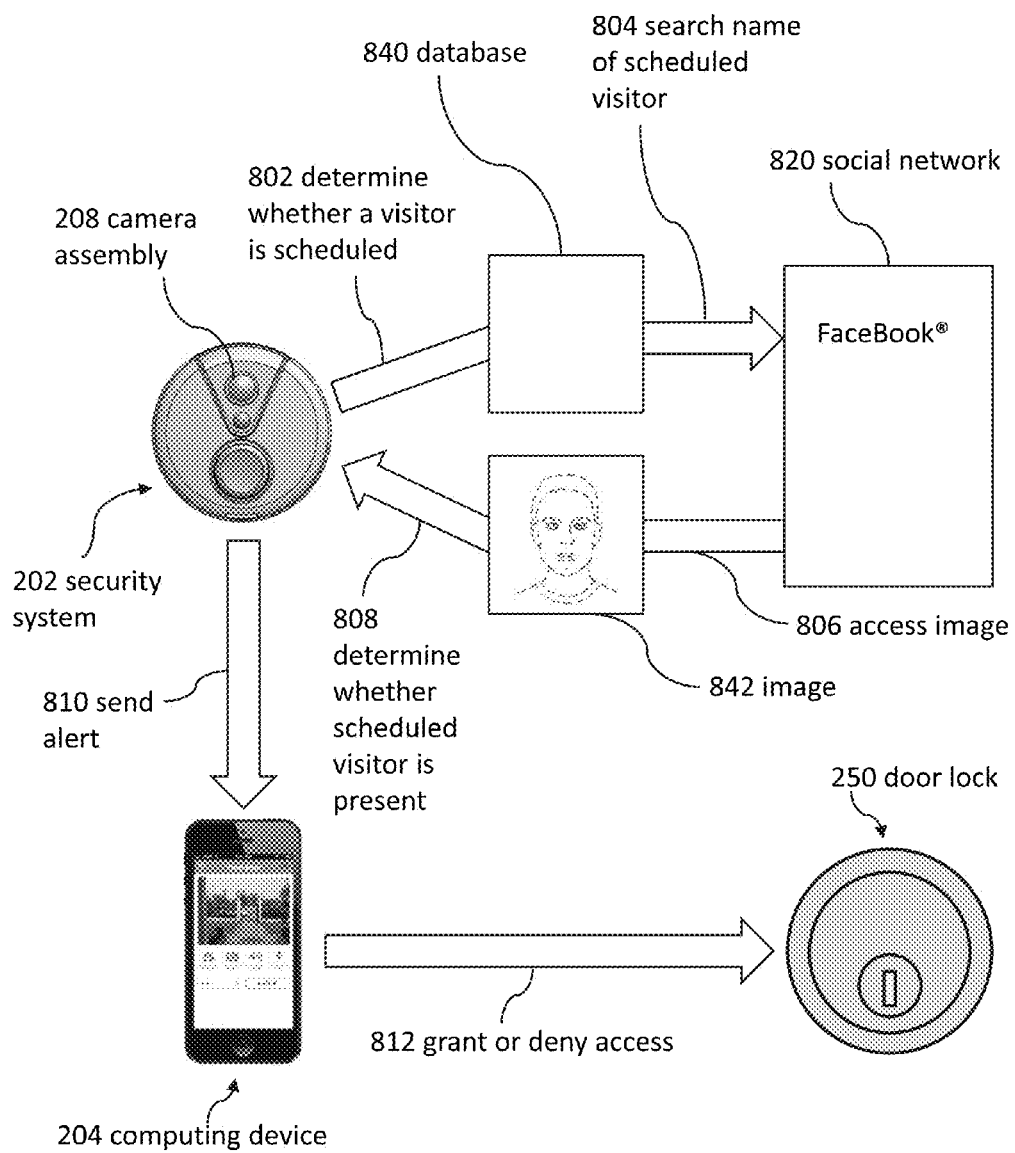

Referring to FIG. 8, some embodiments may include a method for using a doorbell 202 to identify a visitor. Again, the doorbell 202 can have a speaker, a microphone, a camera 208, and a button 212 that is configurable to enable the visitor to sound a chime 302. Some embodiments can include using the doorbell 202 to detect the visitor while the visitor is located outside of a building 300 to which the doorbell 202 is attached. The building 300 comprises a door 254 having a lock 250 that is configured to fasten the door 254 to inhibit unauthorized entry into the building 300. As well some embodiments can include using the doorbell 202 to take an image of the visitor.

With continued reference to FIG. 8, some embodiments can include determining, via a database 840 that is associated with a user of a remote computing device 204, whether a visitor is scheduled to arrive within a predetermined time of a present time (step 802). Again, the predetermined time can be any time plus or minus a present time. For example, in some embodiments, the predetermined time is ±60 minutes. In response to a determination that a visitor is scheduled to arrive, the method can also include determining, via the database 840, a name of the scheduled visitor.

The method can also include accessing the at least one online social network 820 and searching, via the at least one online social network 820, for an account with a name of the scheduled visitor (step 804). It should be appreciated that the steps of accessing the at least one online social network and searching, via the at least one online social network, for a profile with a name of the scheduled visitor both occur in response to any other operation, such as the user opening an application associated with the doorbell 202 on the remote computing device 204. In another example, the accessing and searching steps (steps 804 and 806) can both occur in response to sending the alert to the remote computing device 204.

It should be appreciated that the name stored in the database 840 may not be an exact match with the name that appears on the at least one online social network 820. For example, the name appearing in the database may be a more formal or informal version of the name that appears on the at least one online social network 820. As such, the method may not produce an exact match, but will determine the name that most closely matches the name appearing in the database 840. As such, the doorbell 202 can be configured to recognize nicknames and their more formal equivalents.

It should also be appreciated that the database 840 can be any type of database associated with the remote computing device 204. For example, the database 840 can be an email account or a calendar associated with the remote computing device 204, or any other application or online database that can be accessed by the remote computing device 204.

With continued reference to the method illustrated in FIG. 8, in response to a determination that the at least one online social network 820 includes an account with a name that substantially matches the name of the scheduled visitor, the method can further include accessing an image associated with the account of the scheduled visitor (step 806), and using facial recognition to determine whether the image of the visitor substantially matches the image associated with the account of the scheduled visitor (step 808).

In response to a determination that the image of the visitor substantially matches the image 842 associated with the account of the scheduled visitor, the method can further comprise sending an alert to a remote computing device 204 to notify the user of the remote computing device 204 regarding a presence of the scheduled visitor outside of the building (step 810). As well, the method can further include using the doorbell 202 to automatically grant the visitor access to the building 300 during a predetermined period of time. As previously mentioned, the predetermined period of time can be any time of day. For example, in some embodiments, the predetermined period of time is any time of day after 1700 hours of the local district time. In some embodiments, the predetermined period of time is any time of day before 1700 hours of the local district time. As well, the doorbell can be configured to automatically grant access to predetermined visitors in the manner mentioned above.

In some situations, the visitor who has approached the door 254 will not be the scheduled visitor as noted in the database 840. In response to a determination that the image of the visitor does not substantially match the image associated with the account of the scheduled visitor, the method may include searching, via the at least one online social network 820, the plurality of images and using facial recognition to determine whether at least one image of the plurality of images substantially matches the image of the visitor. It should also be appreciated that the at least one online social network can comprise a personal social network and a professional social network. Accordingly, some embodiments can include determining, via the database 840, whether the scheduled visitor is associated with a personal appointment or a professional appointment. In response to a determination that the scheduled visitor is associated with a personal appointment, some embodiments can include accessing and searching the personal social network first, and if no match is found, then searching the professional social network.

Alternatively, in response to a determination that the scheduled visitor is associated with a professional appointment, some embodiments can include accessing and searching the professional social network first, and if no match is found, then searching the personal social network.

Furthermore, in some embodiments the method can further include searching, via the at least one online social network, a plurality of secondary images that are associated with online social network accounts that are secondary connections to the user and using facial recognition to determine whether the image of the visitor substantially matches at least one image of the plurality of secondary images.

As well, in response to a determination that the image of the visitor does not substantially match at least one image of the plurality of secondary images that are associated with online social network accounts that are secondary connections to the user, the method can further include searching, via the at least one online social network, a plurality of tertiary images that are associated with online social network accounts that are tertiary connections to the user. In accordance, the method can use facial recognition to determine whether the image of the visitor substantially matches at least one image of the plurality of tertiary images.

Figure 9:
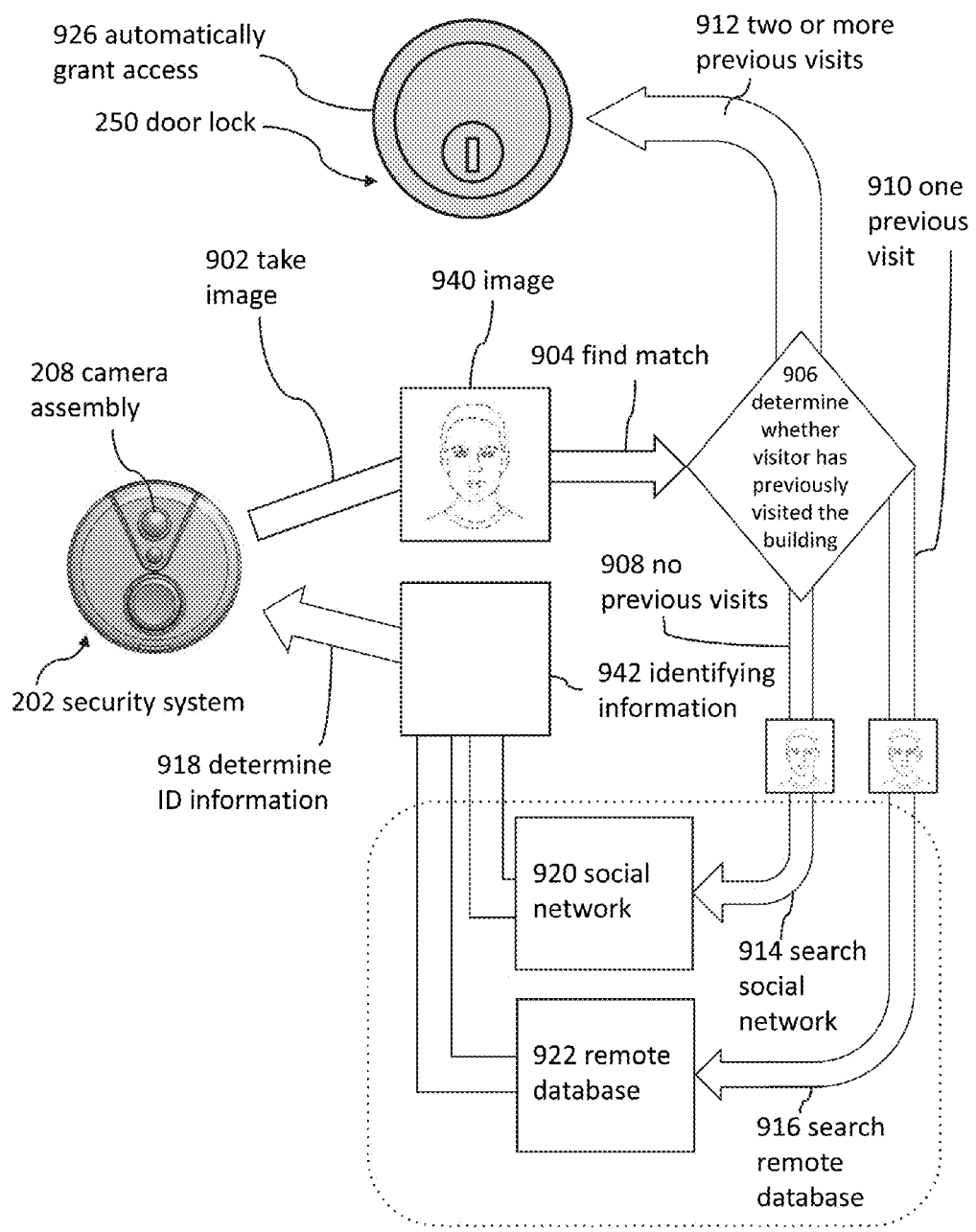

As illustrated in FIG. 9, some embodiments may include a method for using a doorbell to identify a visitor. The doorbell can have a speaker, a microphone, a camera 208, and a button 212. The button 212 can be configurable to enable the visitor to sound a chime 302. Some embodiments can include using the doorbell 202 to detect the visitor while the visitor is located outside of a building 300 to which the doorbell 202 is attached. The building can comprise a door 254 having a lock 250 that is configured to fasten the door 250 to inhibit unauthorized entry into the building 300. The method can also include using the doorbell 202 to take an image 940 of the visitor (step 902). As well, some embodiments can include using the doorbell 202 to access a remote database 922 and to determine, using facial recognition, whether the image 940 of the visitor matches a visitor who has previously visited the building 300 (steps 904 and 906).

With respect to the embodiment illustrated in FIG. 9, the method may include varying levels of scrutiny for visitors that approach the building 300. For example, new visitors can be more heavily scrutinized than frequent visitors. In this manner, new visitors may need to have their identity verified by the at least one online social network and then be granted access by the user of the remote computing device 204. In contrast, frequent visitors (i.e., visitors who have visited more than two times) may only be verified by the at least one online social network and may then be granted automatic access. As well, semi-frequent visitors (i.e., visitors who have visited just one time) may have their identity verified by a remote database and/or be granted access by the user of the remote computing device 204.

It should be appreciated that the levels of scrutiny of visitors can be varied based on any number of previous visits. Specifically, in response to a determination that the visitor has not previously visited the building 300 (step 908), some embodiments can include using the doorbell 202 to access at least one online social network 920 that comprises a plurality of images.

Some embodiments can include using the doorbell 202 to search, via the at least one online social network 920, the plurality of images (step 914) and use facial recognition to determine whether the image of the visitor substantially matches at least one image of the plurality of images (step 918). As well, some embodiments can include using the doorbell 202 to send an alert to a remote computing device 204 to notify a user of the remote computing device 204 of a presence of the visitor outside of the building 300 and the visitor's identity. Finally, some embodiments can include using the doorbell 202 to receive instructions from the user to either grant or deny the visitor access to the building 300.

As well, in response to a determination that the visitor has previously visited the building 300 (step 912), some embodiments can include using the doorbell 202 to automatically grant the visitor access to the building 300 (step 926). The term "previously visited" can mean just one visit or two or more visits. Again, the level of scrutiny can be configured according to any number of previous visitor visits.

In response to a determination that the visitor has previously visited the building 300 one time, some embodiments can include using the doorbell 202 to access at least one online social network 920 that comprises a plurality of images, and to search, via the remote database 922, the plurality of images and use facial recognition to determine whether the image of the visitor substantially matches at least one image of the plurality of images. As well, the embodiment can include using the doorbell 202 to send an alert to the remote computing device 204 of the user. The alert can include any type of information to identify the visitor located outside the building 300. For example, the alert can comprise a notification of the presence of the visitor outside of the building 300, the visitor's identity, and that the visitor has previously visited the building 300 one time. As well, the embodiment can include using the doorbell 202 to receive instructions from the user to either grant or deny the visitor access to the building 300.

It should also be appreciated that the step of automatically granting the visitor access to the building 300 can occur during a predetermined period of time. In some embodiments the predetermined period of time is after 1700 hours local district time. While in some embodiments, the predetermined period of time is before 1700 hours local district time. It should be appreciated that the predetermined period of time can be any time of day or duration of time as specified by the homeowner.

Figure 10:
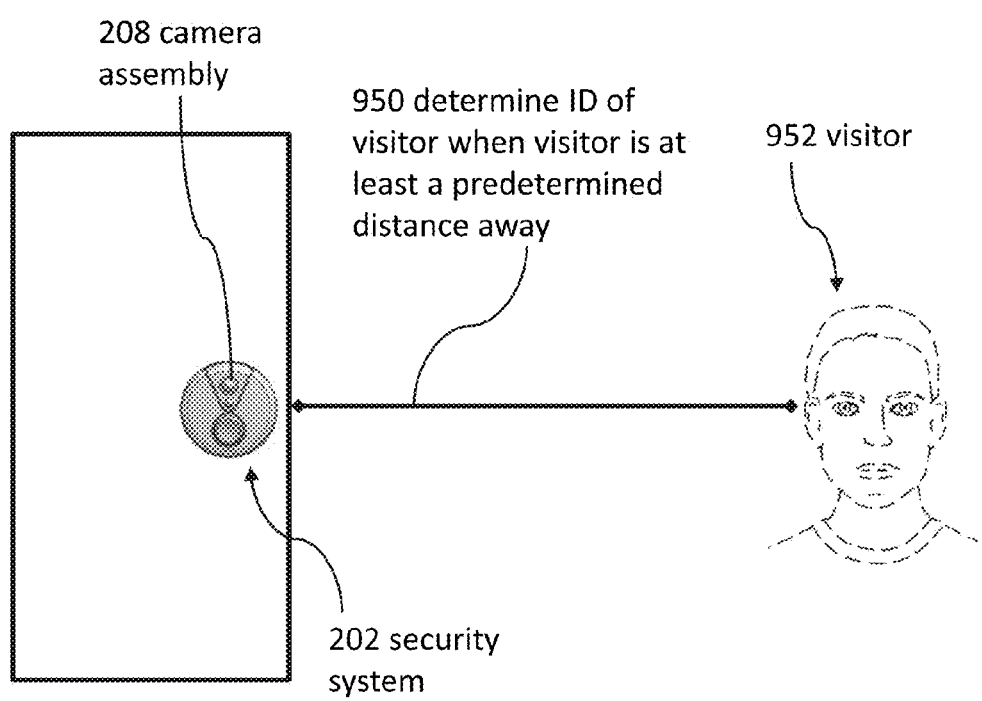

With reference to FIG. 10, some embodiments can include using the doorbell to: 1) access at least one online social network 920 that comprises a plurality of images, 2) search, via the at least one online social network 920, the plurality of images and use facial recognition to determine whether the image of the visitor 952 substantially matches at least one image of the plurality of images, and 3) send an alert to a remote computing device 204 to notify a user of the remote computing device 204 of a presence of the visitor 952 outside of the building 300 and the visitor's identity (step 950). These steps can be performed before the visitor 952 is within a first predetermined distance of the building 300.

As well, some embodiments can include using the doorbell 202 to automatically grant the visitor 952 access to the building 300 before the visitor 952 is within a second predetermined distance of the building 300. It should be appreciated that the first predetermined distance can be equal to the second predetermined distance. In some embodiments, both the first and second predetermined distances can be 30 feet. In some embodiments, the first and second predetermined distances can be 100 feet. Alternatively, the first and second predetermined distances can be different from each other. It should be appreciated that the first and second predetermined distances can be any distance.

In some embodiments, the doorbell 202 receives instructions from the user to either grant the visitor 952 access to the building 300 or deny the visitor 952 access to the building 300. These instructions can be received by the doorbell before the visitor 952 is within a third predetermined distance of the building 300. These instructions can be received before the visitor visits the building 300 and is detected by the doorbell 202.

In some embodiments, the third predetermined distance can be 5 feet. As well, in some embodiments, the third predetermined distance can be 30 feet. However, it should be appreciated that the third predetermined distance can be any distance.

The doorbell 202 can also be configured to provide audible messages to visitors. Specifically, in response to receiving instructions from the user to grant the visitor access to the building 300, and when the visitor is within a predetermined distance of the building 300 (e.g. 3 feet), some embodiments can include using the doorbell 202 to provide a first audible message to the visitor. The first audible message can comprise any type of message such as a greeting and the visitor's first name. As well, in response to a determination that the visitor has previously visited the building 300, and when the visitor is within a predetermined distance of the building 300 (e.g. 3 feet), the embodiment can include using the doorbell 202 to provide a second audible message to the visitor. The second audible message can also comprise any type of message such as a greeting and the visitor's first name.

It should be appreciated that the first audible message can be the same as the second audible message. Alternatively, it should be appreciated that the first audible message and the second audible message can be different. In general, any type of audible message can be used for welcome and unwelcome visitors. For example, if a good friend whom frequently visits the homeowner pays a visit, the second audible message can include a greeting, the good friend's name, and a rhetorical question. However, if a new friend stops by, one that hasn't visited the homeowner, the first audible message might include a greeting, the new friend's name, and a joke. In some situations, unwelcome visitors may approach the building, such as solicitors. Another audible message can be played that instructs the solicitor that the homeowner does not welcome solicitors at the property.

While this disclosure describes facial recognition as the means for identifying visitors, it should be appreciated that any type of technology can be used that is able to identify visitors by their physical appearance or physical makeup. For example, some embodiments include fingerprint matching to verify the identity of the visitor. A visitor can place her finger over the camera assembly 208 to enable the system 200 to detect her fingerprint. Some security system 202 embodiments include a fingerprint reader 210. The fingerprint reader 210 can enable the system to compare the fingerprint of the visitor to a database of fingerprints to identify and/or classify the visitor. The database of fingerprints can be created by the user and/or can include a database of fingerprints from a law enforcement agency (e.g., a database of criminals).

The fingerprint reader 210 can use any suitable algorithm including minutia and pattern algorithms. The fingerprint reader 210 can analyze fingerprint patterns including arch patterns, loop patterns, and whorl patterns. The fingerprint reader 210 can include any suitable fingerprint sensor including optical, ultrasonic, passive capacitance, and active capacitance sensors.

The fingerprint reader 210 can be integrated into the outer housing 224 of the security system 202, which can be mounted within 7 feet of a door or entryway. In some embodiments, the security system 202 can be configured to be mounted in an entryway. Some methods include mounting a security system in an entryway of a building.

The fingerprint reader 210 can be integrated into the doorbell button 212. Pressing the doorbell button 212 can enable the fingerprint reader 210 to analyze the fingerprint of the visitor.

Several embodiments can establish a visitor's identity by detecting a signal from a device associated with the visitor (e.g., detecting the visitor's smartphone). Examples of such a signal include Bluetooth, WiFi, RFID, NFC, and/or cellular telephone transmissions.

It should be appreciated that any of the embodiments described in this disclosure can also be implemented using a system, such as a doorbell 202, as described. The system can include a processor and memory coupled to the processor. The memory can comprise executable instructions that, when executed by the processor, cause the processor to effectuate the operations or the steps as described anywhere in this disclosure.

Alternatively, the embodiments described in this disclosure can also be implemented using a computer-readable storage medium that can comprise executable instructions for using a doorbell 202, as described. When the instructions are executed by a processor, this can cause the processor to effectuate operations or the steps as described anywhere in this disclosure.

Users often like to know who is ringing their doorbell. The identity of the visitor can help the user and/or the doorbell system know how to best respond to the visitor. For example, a user would likely want to respond differently to a criminal than to a trusted friend. Online social networks can include information that can enable doorbell systems to distinguish between visitors who are friends and visitors who are strangers (or even criminals).

By accessing the social network, the doorbell system can assess a relationship between a visitor that rings a doorbell and a user (e.g., a homeowner). If the social network shows that the user has a known (and possibly close) relationship with the visitor, then the doorbell system can treat the visitor accordingly. If the social network does not show that the user has a relationship with the visitor, then the doorbell system can treat the visitor as a stranger rather than as a trusted friend.

The user can create a profile that includes information regarding how the doorbell system should respond to visitors that belong to different categories (e.g., household members, family, close friends, acquaintances, strangers). The categories can represent a spectrum of relationships. The doorbell system can respond to a visitor according to response protocol parameters associated with each category.

Accessing the information in online social networks sometimes requires the user to provide password information to the doorbell system. Then, the doorbell system can search online social networks for useful information.

Figure 12:
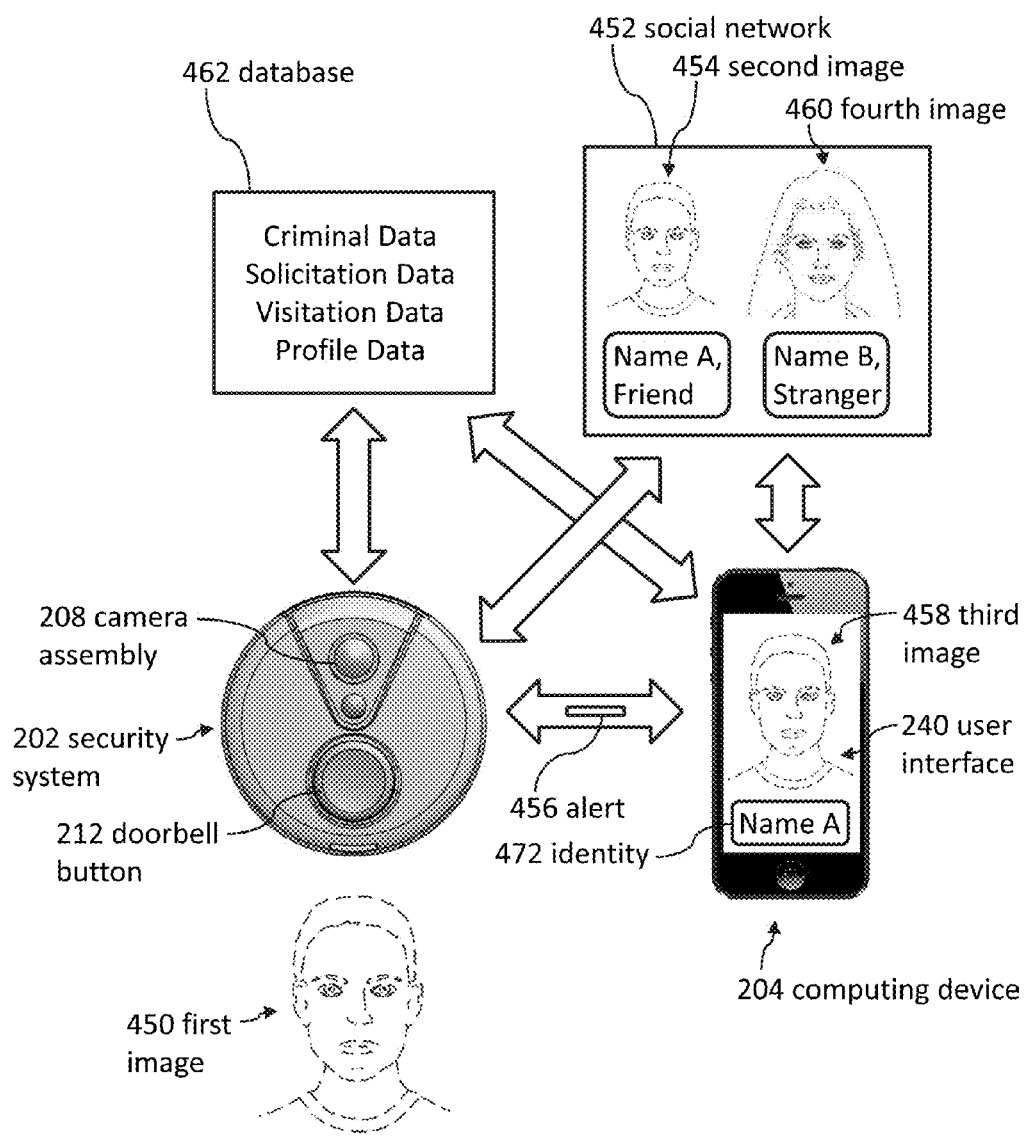
FIG. 12 illustrates a diagrammatic view of methods that use data from social networks, according to some embodiments.

Referring now to FIG. 12, methods can include using a doorbell system 200 (as shown in FIG. 1) to identify a first visitor. The doorbell system can have a doorbell 202 that comprises a camera 208 and a button 212 configured to sound a chime. Some embodiments include detecting, by the doorbell, the first visitor; taking, by the doorbell, a first image 450 of the first visitor; and searching, by the doorbell system 200, an online social network 452 that comprises a plurality of images having a second image 454. The doorbell's button 212, camera assembly 208, and/or motion sensor 218 (labeled in FIG. 1) can be used by the doorbell 202 to detect visitors.

The online social network 452 can be Facebook, LinkedIn, or any other online social network. An online social network allows groups of people to share information online. This shared information can include pictures, messages, and blog posts. The social networks can be password protected and/or protected by an invitation system that enables users to at least partially control who can see portions of the information they share online. These social networks can enable people to accumulate human connections and friendships.

Methods can also include determining (e.g., by the doorbell system 200) that the first image 450 taken by the doorbell 202 and the second image 454 of the online social network show the first visitor. Image comparison can include computer image recognition and facial recognition.

Several embodiments include determining a name associated with the second image based on information of the online social network, and then associating, by the doorbell system 200 (shown in FIG. 1), the name with the first visitor. For example, once the doorbell system 200 finds a picture in the social network 452 that shows the same person as the first image 452 taken by the doorbell 202, the doorbell system 200 can find a name associated with the picture. The doorbell system 200 can also find other information associated with the picture such as criminal history, solicitation history, and data regarding when the person has been seen by other doorbells.

Some embodiments include sending an alert 456 to a remote computing device 204. The alert 456 can comprise the name and a third image 458, taken by the doorbell 202, of the first visitor. The first image 450 and the third image 458 can be identical (e.g., actually the same image). In some cases, the first image 450 and the third image 458 can be different. The doorbell 202 can take the first image 450 at a first time and can take the third image 458 at a second time that is later than the first time.

Several embodiments include determining a social relationship between the first visitor and a user of a remote computing device 204 to which the doorbell 202 system is configured to send an alert 456 in response to the doorbell 202 detecting the first visitor. Determining a social relationship can include determining if the visitor is a "friend" or "connection" of the user (according to the online social network). For example, as shown in FIG. 12, the second image 454 is associated with a name of the person shown in the second image 454. In addition, the social network 452 includes information that enables the system to determine that the visitor is a friend of the user. The social network also includes a fourth image 460 of a person that is a stranger to the user.

Referring now to FIG. 3, the doorbell 202 can be coupled to a building 300. Methods can include granting the first visitor access to the building 300 in response to the social relationship (e.g., by unlocking the door lock 250).

Referring now to FIGS. 1 and 12, embodiments can include determining, by the doorbell system 200 searching the online social network 452, an identity (e.g., a name or other identifying information) of the first visitor by comparing a first trait of the first image 450 to the plurality of images of the social network 452. The first trait can be a physical characteristic of the first image 450 (e.g., a distance between the eyes of the visitor or a shape of the face of the visitor). The doorbell system 200 can determine via facial recognition that the first visitor is shown in the second image 454.

The doorbell system 200 can comprise a remote computing device 204. Methods can comprise selecting, by the remote computing device 204, a first sound to be emitted by the doorbell 202 in response to detecting, by the doorbell 202, a person having a certain identity. This method allows the doorbell 202 to emit the first sound to the first visitor and to emit a different sound to a second visitor. For example, the first sound can say, "Hello, Jim. Please leave the apples inside." The different sound can be tailored to strangers. For example, the different sound can say, "Sorry, but we don't accept solicitors."

The remote computing device 204 can be used to record the first sound (e.g., by using a microphone of the remote computing device). This enables the first sound to be a message spoken by the user of the remote computing device 204. The user can record different sounds for different visitors. Some sounds can be songs tailored to a user's preferences for each type of visitor. For example, a birthday song can be played by the doorbell 202 in response to the doorbell system 200 recognizing a person on her birthday.

Several embodiments include sending an alert to the remote computing device 204. The alert can comprise the identity (e.g., a name, a description, personal information) and a third image, taken by the doorbell, of the first visitor.

The doorbell system can search a database 462 (e.g., a criminal database) to determine whether the identity matches a person having a criminal record. The database 462 can be located remotely relative to the doorbell 202, computing device 204, and/or social network 452.

This criminal recognition feature can be especially helpful to users of doorbell systems 200. The alert 456 sent to a remote computing device 204 can include the identity and a characteristic of the criminal record. The characteristic of the criminal record can include the fact that the visitor was previously convicted of a crime or has a current arrest warrant. The characteristic of the criminal record can also include a danger rating based on past criminal acts.

Users of doorbell systems 200 can also be leery of solicitors. Multiple doorbells 202 can aggregate data to create a database 462 (e.g., a solicitor database). The solicitor database can also be created based on third-party sources. The doorbell system 200 can search a solicitor database to determine whether the identity of the visitor matches a person having a solicitation record. The doorbell system 200 can send an alert 456 to the remote computing device 204. The alert 456 can comprise the identity and a characteristic of the solicitation record (e.g., the numbers of times the person has solicited in a neighborhood).

As shown by the arrows in FIG. 12, the doorbell 202 can communicate (e.g., wirelessly) with the database 462, the social network 452, and/or the remote computing device 204. The remote computing device 204 can communicate (e.g., wirelessly) with the doorbell 202, the database 462, and/or the social network 452. In some embodiments, the doorbell 202 portion of the doorbell system 200 does most of the data analysis. In some embodiments, the remote computing device 204 and/or a server 206 portion of the doorbell system 200 does most of the data analysis.

A doorbell system can include a doorbell 202 communicatively coupled with a remote computing device 204 and an online social network 452; a first image 450 taken by a camera 208 of the doorbell 202; and a second image 454 stored in the online social network 452. The system can include an image comparison system 470 (shown in FIG. 1) configured to determine whether the first image 450 (taken by the doorbell 202) and the second image 454 (of the online social network 452) show the first visitor.

The system can include an identity 472 determined by the doorbell system searching the online social network 452 and comparing a first trait of the first image 450 to a plurality of images stored in the online social network 452. As shown in FIG. 12, a user interface 240 of the remote computing device 204 displays the identity 472 of the first visitor in response to the image comparison system 470 determining that the first image 450 taken by the doorbell 202 and the second image 454 of the online social network 452 show the first visitor. The user interface 240 of the remote computing device 204 can show a live video of the first visitor while displaying the identity 472. The user interface 240 can also show the third image 458 of the visitor.

User Interface Embodiments

Figure 11:
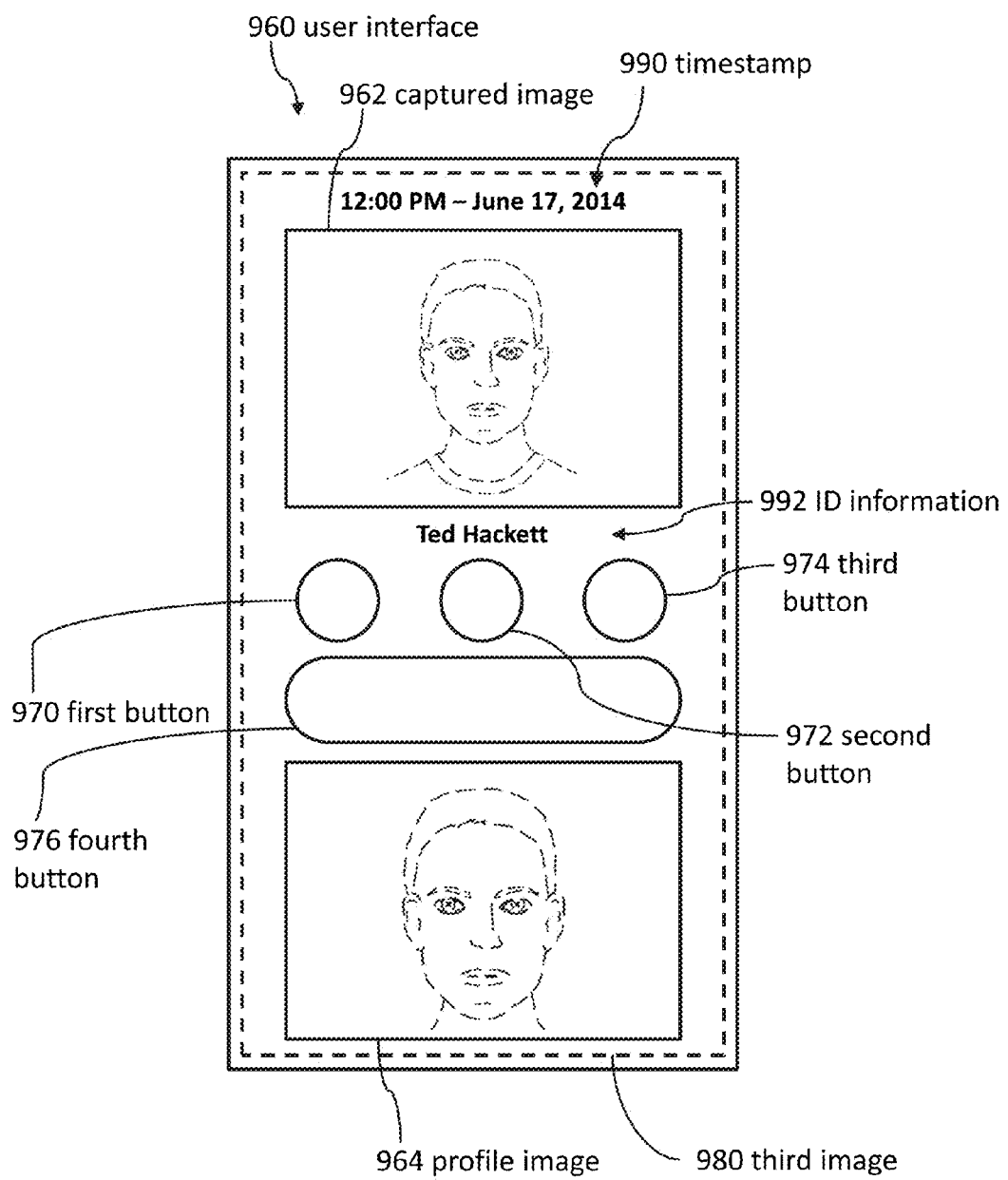
FIG. 11 illustrates a front view of a user interface, according to some embodiments.

FIG. 11 illustrates a user interface 960 that can be displayed on the computing device 204 (shown in FIG. 1). User interfaces can have many different shapes and layouts. Some user interfaces are websites. Some user interfaces are displayed on smartphones, tablets, or any other remote computing device.

In the embodiment shown in FIG. 11, the user interface 960 can simultaneously display a captured image 962 (e.g., an image taken by the doorbell when a visitor approaches the doorbell) and a profile image 964 (e.g., an image from the at least one online social network that substantially matches the captured image 962). As such, the captured image 962 can be a "live" image that shows the visitor at the door in real time. It should be appreciated that this disclosure can include a method for saving a third image 980 (e.g., a screenshot) that comprises the captured image 962 and the profile image 964 to validate that the visitor actually visited the building.

The user interface 960 can also include a first button 970, a second button 972, and a third button 974. Selecting the first button 970 can cause the doorbell to take a picture of the visitor. Selecting and/or holding the second button 972 can allow the user to talk with the visitor. Selecting the third button 974 can terminate communication between the user and the visitor.

Some methods can include enabling the visitor to control the lock 250 in response to receiving a profile image 964 from the at least one online social network that substantially matches the captured image 962. It should be appreciated that the user interface embodiments can be configured based on the homeowner's preference and/or the accuracy of the facial recognition technology. For example, some user interface embodiments can display the captured image 962 and the profile image 964 so that the user of the remote computing device 204 (e.g. homeowner) can manually decide whether to grant or deny access to the building. However, some embodiments can be configured such that the facial recognition technology determines whether a match exists and then grants or denies the visitor access to the building, thus requiring little or no interaction by the user of the remote computing device 204.

In some embodiments, the first image 962 is a still picture and the second image 964 is a real-time video. As used herein, "real-time video" means that each moment captured in the video is displayed on a remote computing device 204 within ten seconds (i.e., with less than a ten second delay).

The user interface 960 can also display identifying information 992 from a scheduled visitor's profile or from the matched profile from the at least one online social network 420. For example, the information 992 can include the name of the scheduled visitor (e.g., based on the time that the visitor is approaching the building). As well, the identifying information 992 can also include any information in regards to the meeting. Generally, it should be appreciated that the identifying information 992 can include any type of information that can help identify the visitor.

Generally, it should be appreciated that the user interface 960 can be any type of interface that is configured to inform the user of the remote computing device 204 about any level of detail to help the user identify the visitor.

Interpretation

For the purposes of this disclosure the term "substantially" should be understood to mean for the most part or to a great or significant extent. For example, to say that an image substantially matches a profile image found on an online social network should be understood to mean that while this might not be an exact 100% match, but for the most part, the facial features or physical traits match the image found on the online social network.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method for using a doorbell system to identify a first visitor, the doorbell system having a doorbell that comprises a camera and a button, the method comprising:
    detecting, by the doorbell, the first visitor;
    taking, by the doorbell, a first image of the first visitor;
    searching, by the doorbell system, an online social network that comprises a plurality of images having a second image; and
    searching, by the doorbell system, a solicitor database to determine whether an identity of the first visitor matches a solicitor identity.

2. The method of claim 1, further comprising determining that the first image taken by the doorbell and the second image of the online social network show the first visitor.

3. The method of claim 2, further comprising determining a name associated with the second image based on information of the online social network, and then associating, by the doorbell system, the name with the first visitor.

4. The method of claim 3, further comprising sending an alert to a remote computing device, wherein the alert comprises the name and a third image, taken by the doorbell, of the first visitor.

5. The method of claim 4, wherein the first image and the third image are identical.

6. The method of claim 4, further comprising taking the first image at a first time, and taking the third image at a second time that is later than the first time.

7. The method of claim 2, further comprising determining a social relationship between the first visitor and a user of a remote computing device to which the doorbell system is configured to send an alert in response to the doorbell detecting the first visitor.

8. The method of claim 7, wherein the doorbell is coupled to a building, the method further comprising granting the first visitor access to the building in response to the social relationship.

9. A doorbell system configured to identify a first visitor, the doorbell system comprising:
    a doorbell communicatively coupled with a remote computing device, an online social network, and a solicitor database;
    a first image taken by a camera of the doorbell; and
    a second image stored in at least one of the online social network and the solicitor database, wherein the first image and the second image are used to identify the first visitor.

10. The doorbell system of claim 9, further comprising an image comparison system configured to determine whether the first image taken by the doorbell and the second image of the online social network show the first visitor.

11. The doorbell system of claim 10, further comprising an identity determined by the doorbell system searching the online social network and comparing a first trait of the first image to a plurality of images stored in the online social network.

12. The doorbell system of claim 11, further comprising a user interface of the remote computing device, wherein the user interface displays the identity of the first visitor in response to the image comparison system determining that the first image taken by the doorbell and the second image of the online social network show the first visitor.

13. A method for using a doorbell system to identify a visitor, the doorbell system having a doorbell that comprises a camera and a button, the method comprising:
    detecting, by the doorbell, the visitor;
    taking, by the doorbell, a first image of the visitor; and determining, by the doorbell system searching a solicitor database, that the visitor is a solicitor.

14. The method of claim 13, further comprising sending an alert to a remote computing device, wherein the alert comprises a solicitor identity.

15. The method of claim 13, wherein the doorbell system comprises a remote computing device, the method further comprising selecting, by the remote computing device, a first sound to be emitted by the doorbell in response to detecting, by the doorbell, a person having the solicitor identity and a second sound to be emitted by the doorbell in response to detecting, by the doorbell, a person not having the solicitor identity, wherein the first sound is different from the second sound.

16. The method of claim 15, further comprising recording, by the remote computing device, the first sound.

17. The method of claim 13, further comprising sending an alert to a remote computing device.

18. The method of claim 17, wherein the alert comprises a solicitation record.

19. The method of claim 18, wherein the solicitation record comprises a number of times the visitor has solicited in a neighborhood.

20. The method of claim 17, further comprising searching, by the doorbell system, a criminal database to determine whether the visitor identity matches a criminal identity.

21. The method of claim 20, wherein the alert comprises the criminal identity and a danger rating based on past criminal acts.

22. The method of claim 13, further comprising determining that the visitor is a solicitor based on a number of buildings the visitor has visited within a predetermined vicinity of the doorbell system.

23. The method of claim 2, further comprising determining the identity of the first visitor based on information from the online social network.

24. The method of claim 1, further comprising:
determining, by the doorbell system searching the online social network, an identity of the first visitor by comparing a first trait of the first image to the plurality of images; and
determining, via facial recognition by the doorbell system, that the first visitor is shown in the second image.

25. The method of claim 24, wherein the doorbell system comprises a remote computing device, the method further comprising selecting, by the remote computing device, a first sound to be emitted by the doorbell in response to detecting, by the doorbell, a person having the identity such that the method comprises configuring the doorbell to emit the first sound to the first visitor and to emit a different sound to a second visitor.

26. The method of claim 24, further comprising sending an alert to a remote computing device, wherein the alert comprises the identity and a third image, taken by the doorbell, of the first visitor.

* * * * *